(12) United States Patent
Okada

(10) Patent No.: US 11,194,537 B2
(45) Date of Patent: Dec. 7, 2021

(54) DISPLAY APPARATUS AND ITS CONTROL METHOD

(71) Applicant: CANON KABUSHIKI KAISHA, Tokyo (JP)

(72) Inventor: Yoshiyuki Okada, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/786,010

(22) Filed: Feb. 10, 2020

(65) Prior Publication Data

US 2020/0272401 A1   Aug. 27, 2020

(30) Foreign Application Priority Data

Feb. 22, 2019 (JP) .............................. JP2019-030190

(51) Int. Cl.
*G06F 3/14* (2006.01)
*H04N 9/31* (2006.01)

(52) U.S. Cl.
CPC .......... *G06F 3/1446* (2013.01); *H04N 9/312* (2013.01); *H04N 9/3111* (2013.01); *H04N 9/3147* (2013.01); *H04N 9/3155* (2013.01)

(58) Field of Classification Search
CPC .. G06F 3/1446; H04N 9/3147; H04N 9/3155; H04N 9/3111; H04N 9/312; H04N 21/4122; H04N 9/3129; H04N 9/3182; G09G 2340/0407; G09G 2370/10; G09G 2370/12; G09G 2370/14; G09G 2370/042; G09G 2340/14; G09G 5/006; G09G 3/001
See application file for complete search history.

(56) References Cited

U.S. PATENT DOCUMENTS

| | | | |
|---|---|---|---|
| 10,250,855 B2 | 4/2019 | Tanaka | |
| 10,520,797 B2 | 12/2019 | Yamamoto | |
| 2018/0084234 A1* | 3/2018 | Yamamoto | ....... H04N 21/43635 |

FOREIGN PATENT DOCUMENTS

| | | |
|---|---|---|
| JP | 2001013937 A | 1/2001 |
| JP | 2007178772 A | 7/2007 |
| JP | 2009010526 A | 1/2009 |
| JP | 2017016041 A | 1/2017 |
| JP | 2017211627 A | 11/2017 |
| JP | 2018050144 A | 3/2018 |

* cited by examiner

*Primary Examiner* — Andrew Sasinowski
(74) *Attorney, Agent, or Firm* — Rossi, Kimms & McDowell LLP

(57) ABSTRACT

A display apparatus configured to display an image corresponding to an image signal includes a receiver configured to receive a first command irregularly transmitted from outside, a transmitter configured to transmit the first command and a second command for requesting an operation of the image signal for each frame to another display apparatus, and a controller configured to cause the transmitter to transmit the first command and the second command to the other display apparatus for each frame.

20 Claims, 34 Drawing Sheets

| PIN NUMBER A | PIN NUMBER B | 10BASE/100BASE-TX | RT/CMD |
|---|---|---|---|
| 1 | 3 | TD+ | NC |
| 2 | 6 | TD- | NC |
| 3 | 1 | RD+ | NC |
| 4 | 4 | NC | RTCMD_TRD+ |
| 5 | 5 | NC | RTCMD_TRD- |
| 6 | 2 | RD- | NC |
| 7 | 7 | NC | GND |
| 8 | 8 | NC | NC |

FIG. 7

| PIN NUMBER A | PIN NUMBER B | 10BASE/100BASE-TX | RT/CMD |
|---|---|---|---|
| 1 | 3 | TD+ | RTCMD_TXD+ |
| 2 | 6 | TD- | RTCMD_TXD- |
| 3 | 1 | RD+ | RTCMD_RXD+ |
| 4 | 4 | NC | GND |
| 5 | 5 | NC | NC |
| 6 | 2 | RD- | RTCMD_RXD- |
| 7 | 7 | NC | NC |
| 8 | 8 | NC | NC |

FIG. 9

| PIN NUMBER A | PIN NUMBER B | 10BASE/100BASE-TX | RT／CMD |
|---|---|---|---|
| 1 | 3 | TD+ | GND |
| 2 | 6 | TD- | NC |
| 3 | 1 | RD+ | GND |
| 4 | 4 | NC | RTCMD_RXD+ |
| 5 | 5 | NC | RTCMD_RXD- |
| 6 | 2 | RD- | NC |
| 7 | 7 | NC | RTCMD_TXD+ |
| 8 | 8 | NC | RTCMD_TXD+ |

FIG. 12

| PIN NUMBER A | PIN NUMBER B | 10BASE/100BASE-TX | RT/CMD |
|---|---|---|---|
| 1 | 3 | TD+ | GND |
| 2 | 6 | TD- | NC |
| 3 | 1 | RD+ | GND |
| 4 | 4 | NC | CMD_TRD+ |
| 5 | 5 | NC | CMD_TRD- |
| 6 | 2 | RD- | NC |
| 7 | 7 | NC | RT_TRD+ |
| 8 | 8 | NC | RT_TRD- |

FIG. 19

| PIN NUMBER A | PIN NUMBER B | 10BASE/100BASE-TX | RT/CMD |
|---|---|---|---|
| 1 | 3 | TD+ | CMD_TXD+ |
| 2 | 6 | TD− | CMD_TXD− |
| 3 | 1 | RD+ | CMD_RXD+ |
| 4 | 4 | NC | GND |
| 5 | 5 | NC | NC |
| 6 | 2 | RD− | CMD_RXD− |
| 7 | 7 | NC | RT_TRD+ |
| 8 | 8 | NC | RT_TRD− |

FIG. 21

| PIN NUMBER A | PIN NUMBER B | 10BASE/100BASE-TX | RT/CMD |
|---|---|---|---|
| 1 | 3 | TD+ | CMD_TXD+ |
| 2 | 6 | TD− | CMD_TXD− |
| 3 | 1 | RD+ | CMD_RXD+ |
| 4 | 4 | NC | GND |
| 5 | 5 | NC | NC |
| 6 | 2 | RD− | CMD_RXD− |
| 7 | 7 | NC | RT_TRD+ |
| 8 | 8 | NC | RT_TRD− |

FIG. 24

| PIN NUMBER A | PIN NUMBER B | 10BASE/100BASE-TX | 1000BASE-T | RT/CMD |
|---|---|---|---|---|
| 1 | 3 | TD+ | TRD0+ | CMD_TXD+ |
| 2 | 6 | TD− | TRD0− | CMD_TXD− |
| 3 | 1 | RD+ | TRD1+ | CMD_RXD+ |
| 4 | 4 | NC | TRD2+ | GND |
| 5 | 5 | NC | TRD2− | CN_CHK |
| 6 | 2 | RD− | TRD1− | CMD_RXD− |
| 7 | 7 | NC | TRD3+ | RT_TRD+ |
| 8 | 8 | NC | TRD3− | RT_TRD− |

FIG. 26

| | NORMAL CONNECTION | UN-CONNECTED | 10/100BASE MISCONNECTED | 1000BASE MISCONNECTED |
|---|---|---|---|---|
| CONNECTION | PULL_UP | OPEN | OPEN | SHORT |
| LEVEL DETERMINATION | H | L | L | L |
| ERRONEOUS DETERMINATION | NORMAL | UN-CONNECTED | UN-CONNECTED | UN-CONNECTED |

FIG. 27

DISPLAY APPARATUS AND ITS CONTROL METHOD

BACKGROUND OF THE INVENTION

Field of the Invention

The present invention relates to a multi-display system that uses a plurality of display apparatuses, such as image projection apparatuses.

Description of the Related Art

A multi-display system is known which displays one lame-screen image by joining images projected from a plurality of image projection apparatuses (referred to as "projectors" hereinafter). Japanese Patent Laid-Open No. ("JP") 2007-178772 discloses a method for making uniform the brightness of a large screen image in which each of the plurality of projectors in the multi-display system drives a diaphragm (aperture stop) so as to adjust a projection light amount based on image feature data indicating a feature of an input image signal.

More specifically, the external device detects the image feature data for each projector, calculates a diaphragm driving amount, and sends the diaphragm driving amount to each projector. The image feature data detected by each projector is transmitted to the external device, and the external device calculates the diaphragm driving amount of each projector based on the image feature data and transmits the calculated diaphragm driving amount to each projector. The image feature data detected by each projector is transmitted and received between the projectors, and each projector calculates its own diaphragm driving amount based on the image feature data detected by itself and the image feature data detected by other projectors.

JP 2017-211627 discloses a communication method among the plurality of projectors in the multi-display system. More specifically, a master projector among the plurality of projectors collects image feature data of each projector. Then, the master projector controls light sources in all the projectors by transmitting set values calculated for commonly controlling the light sources of all the projectors to other projectors.

Most projectors perform various settings and notify device statuses in response to commands from external operation devices. In order to send the command from the external operation device to the plurality of projectors, the LAN connection is necessary. In this case, the external operation device is connected to a HUB via a LAN cable, and the HUB is connected to the plurality of projectors via a plurality of LAN cables. The multi-display systems disclosed in JP 2007-178772 and JP 2017-211627 transmit and receive the image feature data among the plurality of projectors via the plurality of cables. If the external operation device is connected to the plurality of projectors using the plurality of cables so that each projector can receive the command from the external operation device, the number of cables increases.

The communications among the plurality of projectors need a communication initialization for each projector. Conventionally, this initialization is made by a user operating a remote controller for each projector. However, the remotely controllable distance range by the remote controller is limited. Hence, for the reliable initialization in each projector where the plurality of projectors disclosed in JP 2007-178772 are installed separately from each other, the user needs to go to each projector and to arduously operate the remote control over the remote control signal receiver.

SUMMARY OF THE INVENTION

The present invention provides a display apparatus, such as a projector, in a multi-display system, which can reduce the number of cables connecting a plurality of projectors to each other, and facilitates communication initializations among a plurality of projectors.

A display apparatus according to one aspect of the present invention is configured to display an image corresponding to an image signal and includes a receiver configured to receive a first command irregularly transmitted from outside, a transmitter configured to transmit the first command and a second command for requesting an operation of the image signal for each frame to another display apparatus, and a controller configured to cause the transmitter to transmit the first command and the second command to the other display apparatus for each frame. A corresponding control method of a display apparatus also constitutes another aspect of the present invention.

Further features of the present invention will become apparent from the following description of exemplary embodiments with reference to the attached drawings.

BRIEF DESCRIPTION OF THE DRAWINGS

FIG. 7 illustrates a connector connection for the half-duplex communication according to the first embodiment.

FIG. 9 illustrates a connector connection for the full-duplex communication according to the first embodiment.

FIG. 12 illustrates a connector connection for the full-duplex communication according to the second embodiment.

FIG. 19 illustrates a connector connection for the half-duplex communication according to the fourth embodiment.

FIG. 21 illustrates connector connections for the full-duplex communication and the half-duplex communication according to the fifth embodiment.

FIG. 24 illustrates connector connections for the full-duplex communication and the half-duplex communication according to the sixth embodiment.

FIG. 26 illustrates connector connections among the full-duplex communication, the half-duplex communication, and a determination unit according to the seventh embodiment.

FIG. 27 illustrates an output of the misconnection determination circuit according to the seventh embodiment.

DESCRIPTION OF THE EMBODIMENTS

Referring now to the accompanying drawings, a description will be given of embodiments according to the present invention.

First Embodiment

Figure 1:
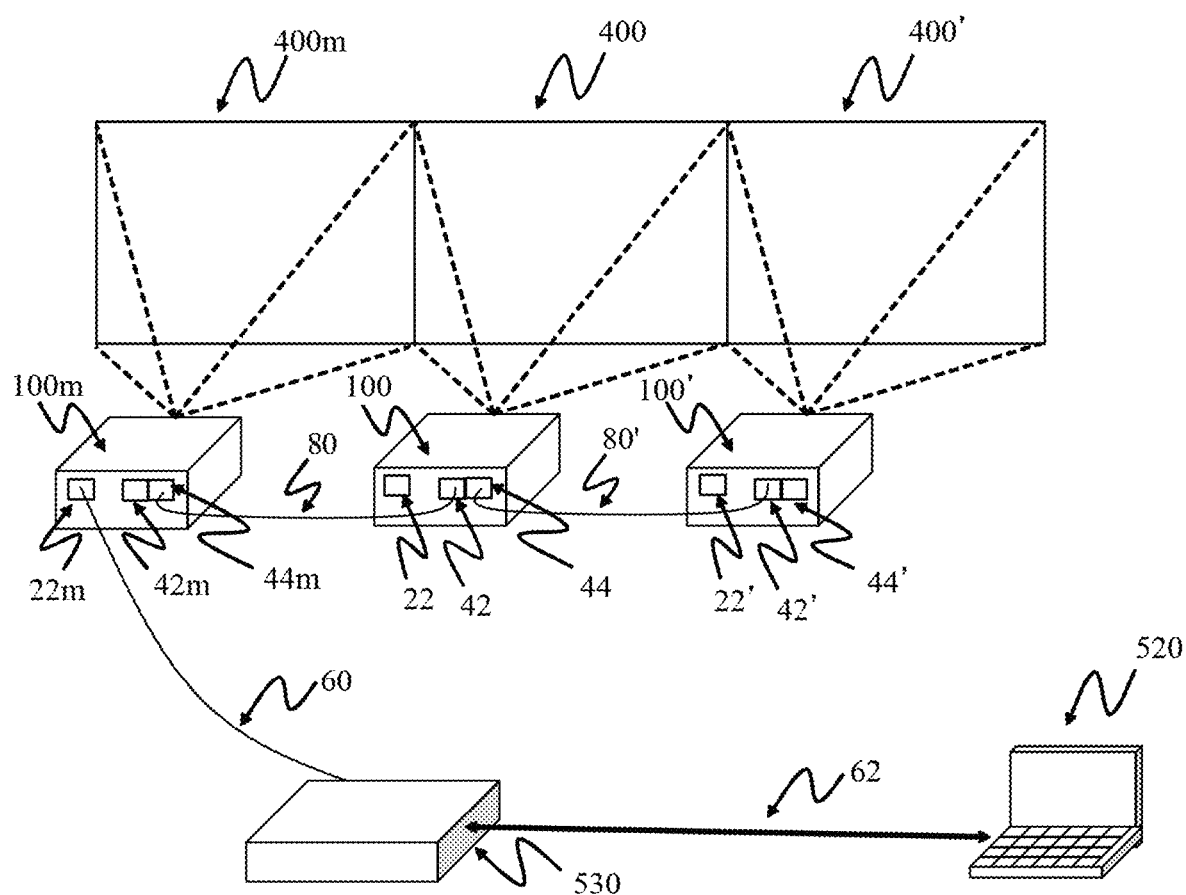
FIG. 1 illustrates a multi-display system according to a first embodiment of the present invention.

FIG. 1 illustrates a multi-display system according to a first embodiment of the present invention. The multi-display system includes a plurality of or N (three in the figure) display apparatuses (image projection apparatuses) as projectors 100*m*, 100, and 100'. The projector 100*m* is a master projector, and corresponds to a first image projection apparatus. The projectors 100 and 100' correspond to N−1 other image projectors, and operate in response to a request (command) from the master projector 100*m*.

Figure 2:
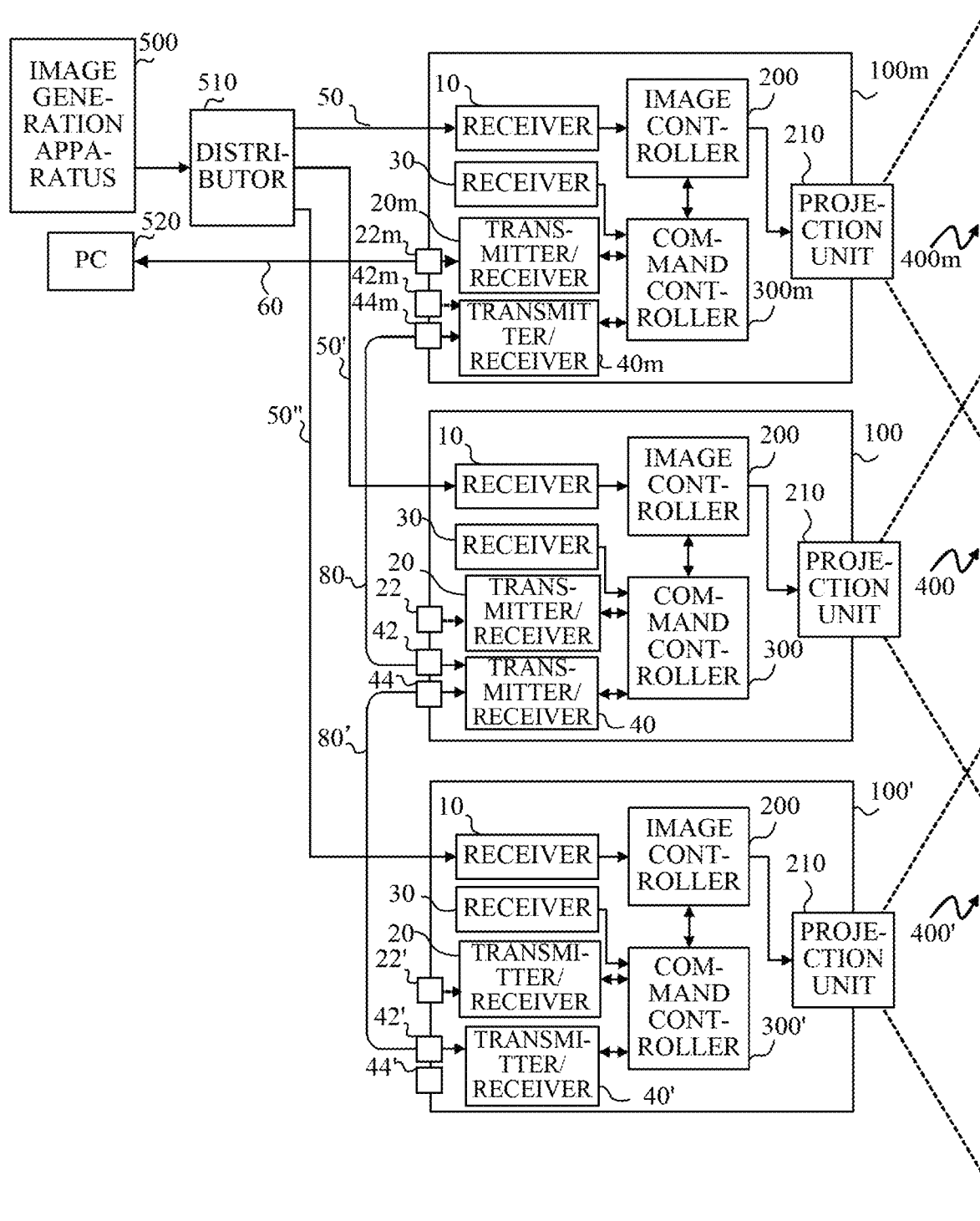
FIG. 2 is a block diagram illustrating an internal configuration of a plurality of projectors according to the first embodiment.

FIG. 2 illustrates an internal configuration of each of the projectors 100*m*, 100, and 100'. An image generation apparatus 500 includes a personal computer (PC), a Blu-ray (registered trademark) disc (BD) player, or the like, and outputs an image (or video) signal conforming to an image signal standard to a distributor 510. The image signal standard includes the HDMI (registered trademark) standard, the DisplayPort standard, or the like. The normalized resolution (number of pixels) of the image signal includes 1280×720, 1920×1200, 1920×1080, 2560×1440, 3840×2160 (4K), 4096×2160 (4K), 5120×2880 (5K), 7680×4320 (8K), and the like.

The distributor 510 divides an image based on the input image signal into three images to be displayed by the respective projectors as illustrated in FIG. 1, and uses the three divided images as three divided image signals for each of the three projectors 100*m*, 100, and 100' via cables 50, 50', and 50". N may be four or more. This embodiment divides the image into three by the distributor 510, but the distributor 510 may distribute the image signal into three (to output the same image signal to each projector) and cut out the image to be displayed on each projector.

The projectors 100*m*, 100, and 100' receive the divided image signal from the distributor 510 at an image receiver 10. The image receiver 10 outputs the received divided image signal to an image controller 200. The image controller 200 performs various image processing for the divided image signal to generate a drive signal, and inputs the drive signal into an unillustrated light modulator to drive it. The light modulator includes a reflection or transmission type liquid crystal panel, a digital micromirror device, or the like.

A projection unit 210 in each of the projectors 100*m*, 100, and 100' converts an image (referred to as a projection image hereinafter) 400*m*, 400, or 400' formed by light emitted from an unillustrated light source and modulated by the light modulator into a projection surface, such as a screen. Thereby, the projection image is displayed.

Each projector includes the image receiver 10, a first command transmitter/receiver 20 and a remote control receiver 30 each serving as a receiver, a second command transmitter/receiver 40 serving as a transmitter, and a command controller 300 serving as a controller or control unit. The reference numerals of the second command transmitter/receiver 40 and the command controller 300 of the master projector 100*m* are labelled with "m" and the reference numerals of the second command transmitter/receiver 40 and the command controller 300 of the projector 100' are labelled with "'".

The first command transmitter/receiver 20 is connected to another projector or an external device via a LAN and Ethernet. In this embodiment, the PC 520 is connected to the first command transmitter/receiver 20 of the master projector 100*m* via the cable 60. The communication performed between the PC 520 and the first command transmitter/receiver 20 is not limited to the LAN communication, but may be a serial communication by RS-232C or the like or a wireless communication such as Wi-Fi (registered trademark).

In FIG. 1, the PC 520 is connected to a HUB 530 as a network switching unit by a cable 62, and the cable 60 is connected to the connector 22m via the HUB 530 and the first command transmitter/receiver 20m in the master projector 100m. The cable 60 from the PC 520 may be directly connected to the connector 22m without passing through the HUB 530. FIG. 1 omits the image generation apparatus 500 and the distributor 510 illustrated in FIG. 2.

The PC 520 transmits various commands to the first command transmitter/receiver 20m in the master projector 100m. The first command transmitter/receiver 20m outputs the received command to the command controller 300m. The command controller 300m controls the master projector 100m in accordance with the command. For example, it sets various types of functions of the projector, collects image processing information such as panel resolution and luminance and chromaticity of an input image signal, information on the projector internal information such as a light source use time, and information on the maintenance history, and returns them to the PC 520.

The remote control receivers 30 of the projectors 100m, 100, and 100' receive commands represented by infrared rays emitted from an unillustrated remote controller and output the received commands to the command controllers 300m, 300, 300'. The command controllers 300m, 300, and 300' perform settings and the like of the respective projectors 100m, 100, and 100' in accordance with the received commands.

The second command transmitter/receiver 40m in the master projector 100m communicates with the second command transmitter/receiver 40 in the projector 100 when the cable 80 connected to the connector 44m is connected to the connector 42 in the projector 100. The second command transmitter/receiver 40' in the projector 100' communicates with the second command transmitter/receiver 40' in the projector 100' when the cable 80' connected to the connector 44 is connected to the connector 42' in the projector 100'. In this way, the master projector 100m and the N−1 projectors 100 and 100' are daisy-chained so as to communicate with each other via the N−1 cables 80 and 80'.

The projectors 100 and 100' are also provided with connectors 22 and 22' corresponding to the connector 22m in the master projector 100m. The master projector 100m is also provided with a connector 42m corresponding to the connectors 42 and 42' in the projectors 100, 100'. The projector 100' is also provided with a connector 44' corresponding to 44m and 44 in the projectors 100m and 100.

Figure 3:
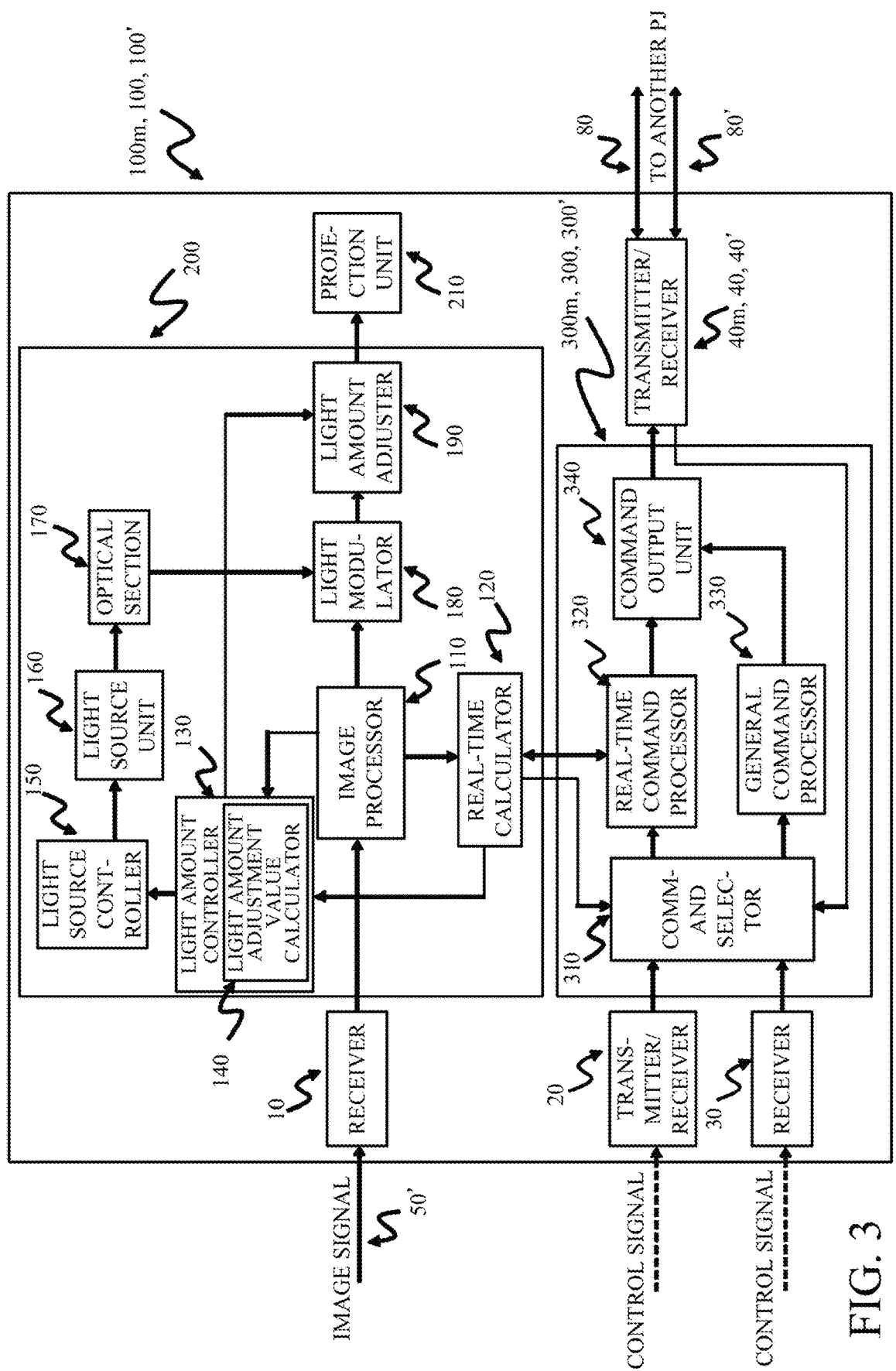
FIG. 3 is a block diagram illustrating details of an internal configuration of each projector according to the first embodiment.

FIG. 3 illustrates details if the internal configuration of each of the projectors 100m, 100, and 100'. The operation of each projector will be described with reference to FIG. 3. The image controller 200 that has received the divided image signal from the image receiver 10 adjusts the image size, color, and luminance for the divided image signal, and generates modulation image data for driving a light modulator 180 described below. A light amount controller 130 calculates an appropriate adjustment value for improving the contrast at a built-in light amount adjustment value calculator 140, and outputs the adjustment value to at least one of a light source controller 150 and a light amount controller 190.

The light source controller 150 drives the light source unit 160. The light source unit 160 includes a high-pressure mercury lamp, an LED, a laser diode, or the like. The LED and laser diode can control a light emission amount with good responsiveness by changing the drive current value. An optical unit 170 includes a plurality of optical elements such as a mirror, a prism, a polarization plate, and a lens, and guides illumination light emitted from the light source unit 160 to the light modulator 180.

The light modulator 180 includes a light modulation element such as a transmission or reflection type liquid crystal panel and a digital micromirror device (DMD), modulates the illumination light incident from the optical unit 170, and generates projection light (image light) when driven in accordance with modulation image data (driving signal) from an image processor 110. The light modulation element may have a resolution such as WUXGA (1920× 1200 pixels) FHD (1920×1080 pixels), a higher 4K resolution and a lower resolution.

When the illumination light is white light, and the optical unit 170 separates the white light into R (red) light, G (green) light, and B (blue) light, the light modulator 180 is provided with a light modulation element for each color light and the light projected from the three light modulation elements is combined by an unillustrated combining optical system. When the illumination light is switched to the R light, the G light, and the B light in a time-division manner, each color light is modulated in the time-division manner by a single light modulation element provided in the light modulator 180.

The driving method of the light modulation element is classified into a line-sequential driving scanning method and a plane-sequential-drive scanning method. For example, in the line-sequential-drive scanning method in which the resolution of the light modulation element is 1920×1200 pixels, first, 1920 pixels on the first pixel row are driven in accordance with the first frame of the modulation image data from the image processor 110. Then, 1920 pixels on the second pixel row are driven in response to the horizontal synchronization signal. When the frame rate is 60 Hz, the horizontal synchronizing signal is repeatedly output at a synchronization of 72 kHz or higher, which has a period of 1200 times or more.

When driving the pixels on the 1200 pixel row ends and the vertical synchronization signal is output, the light modulation element starts driving in the next frame. When the frame rate is 60 Hz, the vertical synchronization signal is repeatedly output at a period of 16.6 ms. This vertical synchronizing signal is a signal representative of the head of the frame when the light modulation element is driven for each frame, and processing in synchronization with the frame needs to be executed in accordance with the output timing of the vertical synchronizing signal.

On the other hand, in the plane-sequential-drive scanning method, modulation use modulation image data for all pixels for one frame is previously written in the light modulator 180, and all pixels of the light modulation element are simultaneously driven in accordance with modulation image data in synchronization with a vertical synchronization signal.

Thus, the vertical synchronization signal indicates timing of the start of a frame or updating regardless of the driving method of the light modulation element. Therefore, processing can be performed in synchronization with the frame based on the vertical synchronization signal.

A projection light amount from the light modulator 180 is adjusted by the light amount controller 190 as necessary. The light amount controller 190 includes a diaphragm having a variable diameter of a light passage opening, a liquid crystal device having a variable transmittance, and the like, and adjusts the projection light amount projected onto the projection surface such as a screen via the projection unit 210. The projection unit 210 forms the projection image by enlarging and projecting the incident projection light onto the projection surface.

Figure 4:
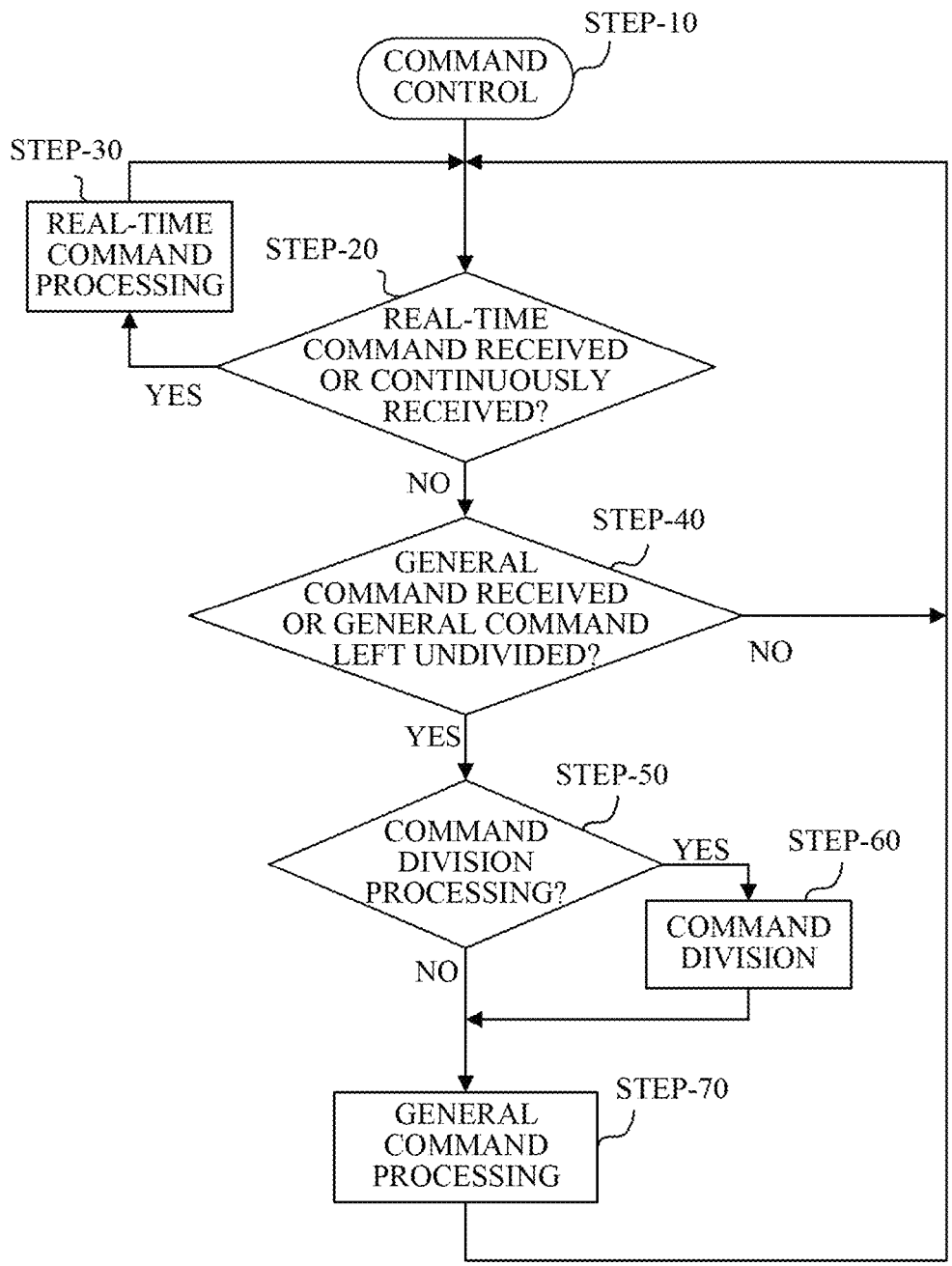
FIG. 4 is a flowchart showing processing of a command controller according to the first embodiment.

Referring now to a flowchart in FIG. 4, a description will be given of the operations of the command controllers 300m, 300, and 300'. In the Step-20, the command controllers 300m, 300, and 300' in which the command control is available in the Step-10 select commands at a command selector 310 illustrated in FIG. 3, which have been received by the first command transmitter/receiver 20, the remote control receiver 30, and the second command transmitter/receiver 40. The first command transmitter/receiver 20 or the remote control receiver 30 receives a non-real-time command as a first command from the PC 520 or the remote control device. The second command transmitter/receivers 40 and 40' in the projectors 100 and 100' other than the master projector 100m receive real-time commands as the second commands transmitted from the master projector 100m or the second command transmitter/receivers 40m and 40 in the projector 100. The command selector 310 determines whether it has received the real-time command (or whether it continuously receives the real-time command).

The real-time command is a command for requesting processing to be executed in synchronization with a frame. For example, when the frame rate is 60 Hz, the real-time command instructs an execution of processing every 16.6 ms. The real-time command according to this embodiment is a command for causing each projector to perform processing of adjusting the luminance of the projection image (projection light).

On the other hand, the non-real-time command is a general command transmitted from the PC 520 or the like, and is a command for requesting an execution of general command processing that can be processed asynchronously with a frame. The general command (non-real-time command) includes a command for requesting each projector to turn on and off the power, to switch an input image signal, and to set an aspect ratio, image quality, and brightness of a projection image. The general command also includes a command for requesting a transmission of information such as a current setting state, working condition, working environment, and maintenance history of each projector. The general commands transmitted from the PC 520 or the like to the projectors 100 and 100' are received by the master projector 100m and transmitted from the projector 100m to the projectors 100 and 100'. Similarly, replies from the projectors 100 and 100' to the PC 520 or the like are made via the master projector 100m.

When the projectors 100 and 100' receive (or continue to receive) the real-time command from the master projector 100m in the Step-20, the command controllers 300 and 300' proceed to the Step-30 and perform real-time command processing, which will be described below. The real-time command processing is performed by a real-time command processor 320 in the command controllers 300m, 300, and 300'.

The contrast ratio of the projection image is the ratio (luminance ratio) between the maximum luminance (white) and the minimum luminance (black), and a high contrast ratio increases a difference between the brightness and the darkness and provides a clear projection image. As a method of improving the contrast ratio, there is a method of changing the luminance (brightness) of the projection image in accordance with luminance information of the image signal. For example, when information indicates bright (high) luminance information of the image signal, the luminance (brightness) of the projection image is made higher (brighter), and when information indicates dark (low) luminance information of the image signal, the luminance (brightness) of the projection image is made lower (darker). This embodiment changes the luminance of the projection image or light by changing the opening amount of the light amount controller 190. However, the luminance of the projection image may be changed by changing the illumination light amount emitted from the light source unit 160.

The luminance of the projection image may be changed every 16.6 ms when the frame rate is 60 Hz, and may be changed every 8.3 ms when the frame rate is 120 Hz or called a high frame rate. In order to improve the contrast ratio of the projection image, it is necessary to control the light amount controller 190 at a period equivalent to the frame rate.

On the other hand, the luminance information of the image signal is calculated as an image feature amount in a real-time operation unit 120 using the modulation image data from the image processor 110. The image feature amount is, for example, information such as a maximum luminance and a minimum luminance of an image signal (modulation image data) or an average luminance, and is updated for each frame.

In this embodiment, when an image signal from the image generation apparatus 500 is divided by the distributor 510 and the image is projected by the plurality of projectors 100m, 100, and 100', the master projector 100m collects the image feature amount acquired by each projector. The real-time calculator 120 in the master projector 100m calculates the luminance (brightness) of the projection image set by each projector using the collected image feature amount.

Figure 5:
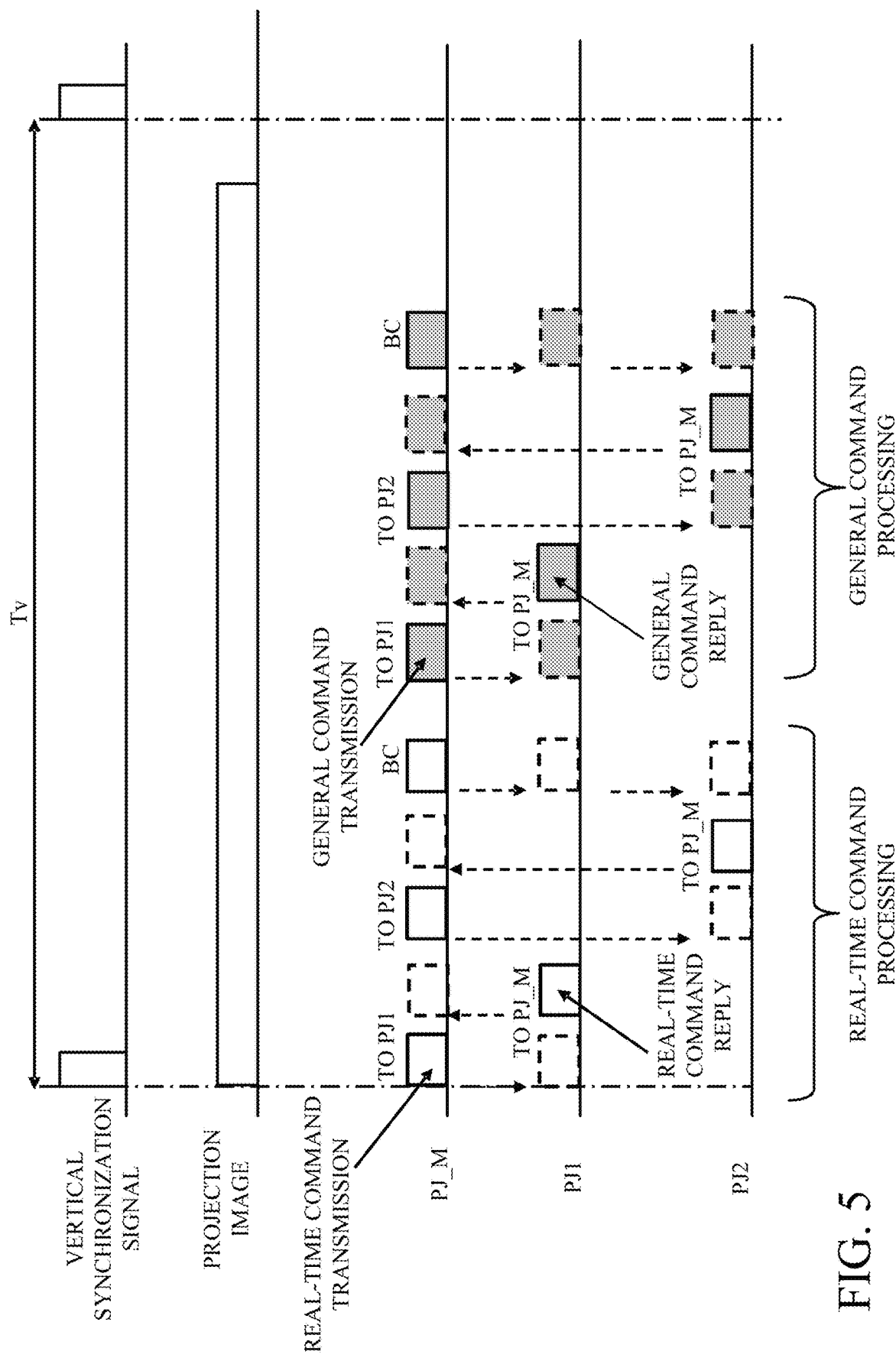
FIG. 5 illustrates timings of a real-time command and a general command according to the first embodiment.

Referring now to FIG. 5, a description will be given of collection processing of the image feature amount by the master projector 100m. FIG. 5 illustrates transmission and reception timings of the real-time command and the general command (non-real-time command) in one frame in the projectors 100m (PJ_M), 100 (PJ1), and 100' (PJ2). This figure illustrates a vertical synchronization signal in synchronization with a frame by a period Tv. For example, when the frame rate is 60 Hz, Tv=16.6 ms. The projection image is projected (updated) in synchronization with the vertical synchronization signal.

A real-time command (shown by a solid line) for requesting a transmission of the image feature amount acquired by the real-time calculator 120 of PJ1 is transmitted from PJ_M to PJ1. When PJ1 receives the real-time command as indicated by the broken line, PJ1 transmits the image feature amount to PJ_M as a reply of the real-time command. PJ_M receives the image feature amount from PJ1 as shown by the broken line.

Next, PJ_M transmits a real-time command for requesting the transmission of the image feature amount to PJ2 as indicated by the solid line. PJ2 receives this real-time command as indicated by the broken line, and transmits the image feature amount to PJ_M as a reply of the real-time command.

When N−1 other projectors (PJ1 and PJ2) are connected to PJ_M, PJ_M repeats the same operation N−1 times and collects image feature amounts from all (N) projectors. The PJ_M real-time calculator 120 calculates a target luminance value of each projector suitable for improving the contrast ratios of the projection images projected by all the projectors, using the collected image feature amounts. The PJ_M light amount adjustment value calculator 140 calculates an adjustment value of the PJ_M in the light amount controller 190 from the target luminance value, and causes the light amount controller 190 to adjust the projection light amount in accordance with to the adjustment value. PJ_M transmits the target luminance value to each of PJ1 and PJ2, causes the light amount adjustment value calculator 140 of PJ1 and PJ2 to calculate an adjustment value of the light amount controller 190 in accordance with the target luminance value, and makes the light amount controller 190 adjust the projection light amount in accordance with the adjustment value.

The target luminance values from PJ_M to PJ1 and PJ2 are transmitted by the simultaneous transmission called a BC (Broadcast) transmission in the following description, and PJ1 and PJ2 receive the target luminance value almost simultaneously as indicated by the broken line. The real-time command are transmitted and received from PJ_M to PJ1 and PJ2 in one frame a plurality of times.

The command controllers 300*m*, 300, and 300', which have determined in the Step-20 that there is no reception or continuation of the reception of the real-time command, determine whether or not a general command has been received in the Step-40, or the general command is left undivided (which will be described later).

The command controllers 300*m*, 300, and 300' return to the Step-20 when there is no reception or undivided portion of the general command, and proceed to the Step-50 when there is the reception or undivided portion of the general command.

In the Step-50, the command controllers 300*m*, 300, and 300' determine whether or not to divide the command. The general command is transmitted and received after the real-time command processing. The general command is transmitted from PJ_M to PJ1 as shown by the solid line, PJ1 receives this general command as shown by the dashed line and makes a reply to this general command as shown by the solid line, and PJ_M receives the reply as indicated by the dashed line. Then, PJ_M performs the BC transmission of information to be transmitted to PJ1 and PJ2 for the general command as shown by the solid line.

Unlike the real-time command processing, the general command processing has no restrictions on its execution timing. Hence, when the command controller 300*m* determines that the general command processing is not completed in one frame in performing the general command processing in addition to the real-time command processing executed for each frame in the Step-50, the command controller 300*m* divides the command in the Step-60 and proceeds to the Step-70.

For example, when determining that only the transmission and reception of the general command end with PJ1 in one frame (period Tv) (when the general command has an undivided portion), the command controller 300*m* performs the transmission and reception of the general command and the BC transmission with PJ2 after the real-time command processing in the next frame. If it is determined that the general command processing does not end within the next frame, the general command processing is further performed by dividing the frame into the next frame.

If the command division is not performed in the Step-50, the command controllers 300*m*, 300, and 300' directly proceed to the Step-70. In the Step-70, the command controllers 300*m*, 300, and 300' perform the transmission or reception processing of the general command. The general command processing is performed by the general command processor 330 in the command controller 300. The general command processing performs turning on and off the power, switching an input image signal, setting the aspect ratio, image quality, brightness, and the like of a projection image.

In the transmission or reception processing of the general command, information such as the current setting state, working state, working environment, and the maintenance history of each projector is collected by PJ_M.

A description will now be given of the BC transmission. FIG. 5 illustrates the BC transmission executed in each of the real-time command processing and the general command processing. The BC transmission simultaneously transmits the same (common) command from the master projector to the other N−1 other projectors, and there is no reply from each of the other projectors to the master projector. For example, in the real-time command processing, the target luminance value is a value common to all projectors. The target luminance value can be sent to all the other projectors by the BC transmission. Since N−1 target luminance values can be thus set by a single command, the number of command transmissions can be smaller by N−2 than setting the target luminance value by sending the command to each of the other projectors. Thereby, the time required for the real-time command processing can be reduced.

Similarly, even in the general command processing, when N−1 other projectors are similarly set, the setting command can be simultaneously transmitted by the BC transmission, and the time required for the general command processing can be reduced.

The second command transmitter/receivers 40*m*, 40, and 40' perform the serial communication using RS-422 or RS-485, for example, through the half-duplex multi-point communication using a two-wire system or the full-duplex multi-point communication using a four-wire system.

Figure 6:
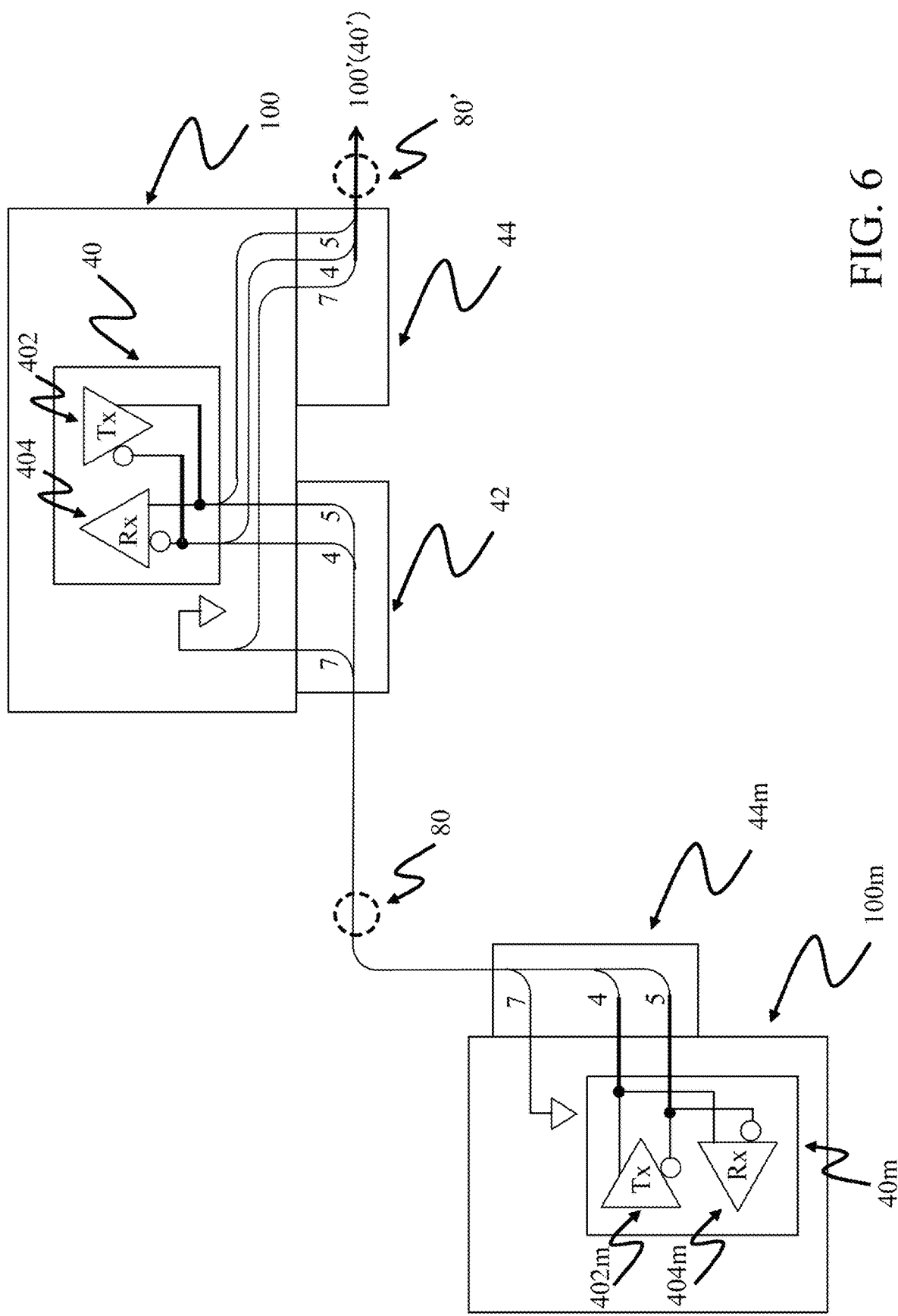
FIG. 6 illustrates a connection for a half-duplex communication according to the first embodiment.

FIG. 6 illustrates a connection example of the half-duplex communication. The second command transmitter/receiver 40*m* in the master projector 100*m* includes a transmitter (Tx) 402*m* and a receiver (Rx) 404*m*. By connecting the input/output pins of the same polarity of Tx402*m* and Rx404*m* to each other, the two-wire communication paths (communication paths designated by 4 and 5 in the figure) are formed. The second command transmitter/receivers 40 and 40' in the other projectors 100 and 100' also include Tx402 and Rx404, and the two-wire communication paths are formed by connecting the input/output pins of the same polarity of Tx402 and Rx404 to each other.

The second command transmitter/receiver 40*m* in the master projector 100*m* is connected to the second command transmitter/receiver 40 in the projector 100 when the cable 80 is connected to the connector 44*m* and the connector 42 in the projector 100. The second command transmitter/receiver 40 in the projector 100 is connected to the second transmitter/receiver 40' in the projector 100' when the cable 80' is connected to the connector 44 and an unillustrated connector in the projector 100'. Thus, the projectors 100*m*, 100, and 100' (second command transmitter/receivers 40*m*, 40, and 40') are daisy-chained via the cables 80 and 80'. The connectors and cables, as used herein, are, for example, the eight-wire LAN cable and RJ-45 connector, and the nine-wire RS-232C cable and Dsub connector.

FIG. 7 shows an illustrative pin arrangement of the RJ-45 connector connected to the LAN cable. The communication rate of RS-422 or RS-485 varies depending on the cable length, but is at most about 10 Mbps. Therefore, the LAN cable for the Ethernet 10BASE/100BASE-TX can be used.

There are two types of LAN cables or the straight cable and the cross cable. The arrangement of pin numbers A and B illustrated in FIG. 7 supposes the cross cable. The broken line indicates wiring in case of the straight cable.

The signal name is described in the column of 10BASE/100BASE-TX. The TD+ of a first pin and TD− of a second pin of the pin number A indicate a differential pair signal serving as a transmission signal. RD+ of a third pin and RD− of a sixth pin indicate a differential pair signal serving as a received signal. The differential pair line for each differential pair signal is configured to have a characteristic impedance of 100Ω. In the cross cable, the first pin of pin number A is connected to the third pin of pin number B, the second pin is connected to the sixth pin, the third pin is connected to the first pin, and the sixth pin is connected to the second pin. The fourth and fifth pins and the seventh and eighth pins are unused pins serving as the differential pair pins, and are subject to the straight connection. Signal lines (commands) that include both the real-time command and the general command in the second command transmitter/receivers 40m, 40, and 40' will be referred to as RTCMD_TRD+ and RTCMD_TRD−.

The half-duplex communication is performed by connecting totally three lines or two differential pair lines and one GND line by a straight connection. By using (connecting) the fourth, fifth, seventh, and eighth pins which are straight-connected to these three wires, the half-duplex communication is available using either the straight cable or the cross cable, and the degree of freedom of cables (wiring) used during the installation is improved.

FIGS. 6 and 7 use the fourth and fifth pins as the differential pair pins and the seventh pin as the GND pin. However, the seventh and eighth pins may be used for the differential pair pins, and the fourth or fifth pin may be used for the GND pins.

Even when the RS-232C cable is used, the differential pair line and the GND line for the half-duplex communication are connected to the straight-connected portions (such as the first, fifth, and ninth pins) in the cross cable and thereby both the straight cable and the cross cable can be used.

Figure 8:
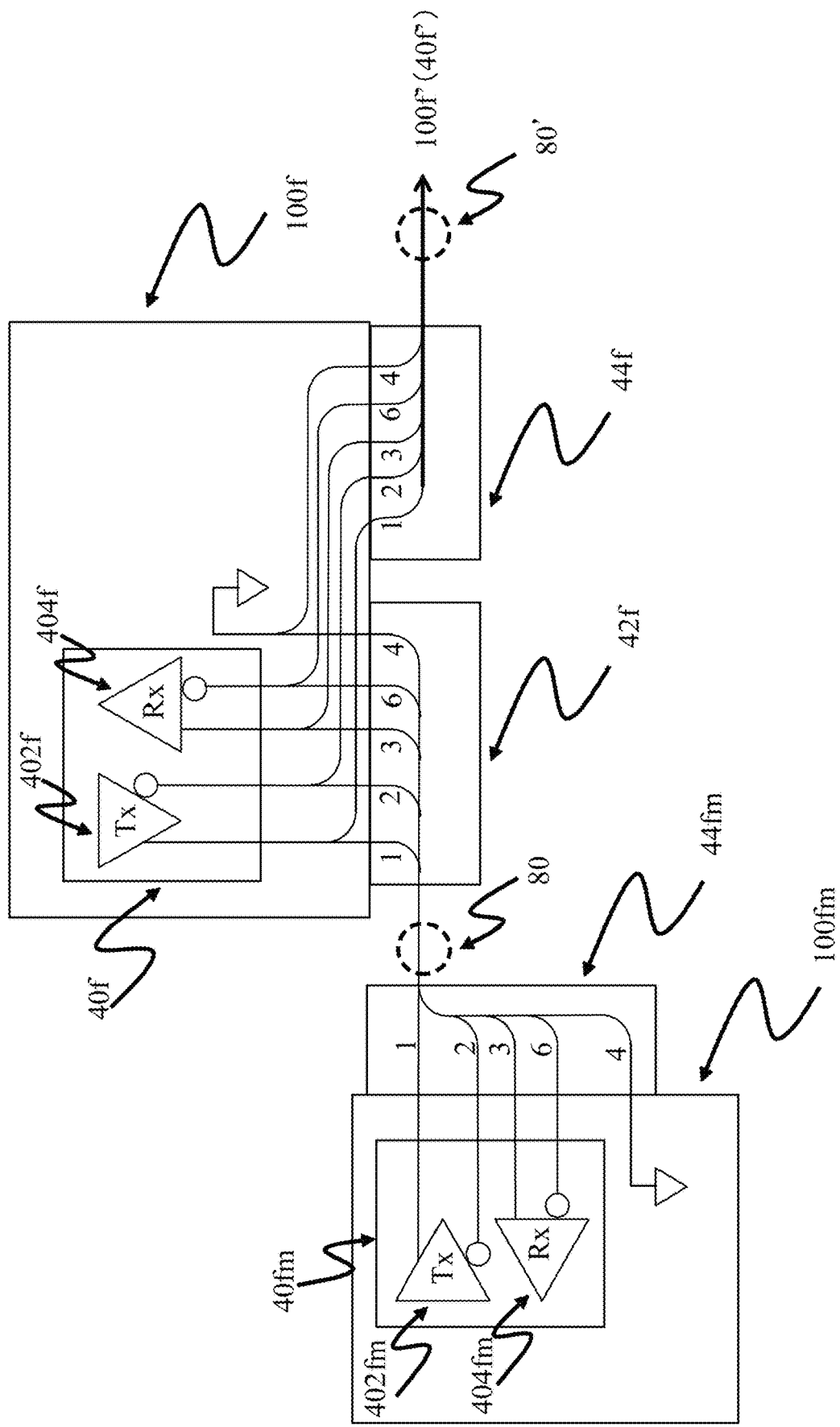
FIG. 8 illustrates a connection for a full-duplex communication according to the first embodiment.

FIG. 8 illustrates an illustrative connection in the full-duplex communication. In FIG. 8, f is added to the reference numeral of each projector and components relating to the full-duplex communication. The second command transmitter/receiver 40fm in the master projector 100fm includes a transmitter (Tx) 402fm and a receiver (Rx) 404fm. The input/output pins of Tx402fm and Rx402fm are used independently of each other to form the four-wire communication path (communication paths designated by first, second, third, and sixth in the figure). The second command transmitter/receivers 40f and 40f in the other projectors 100f and 100f also include Tx402f and Rx404f, and the input/output pins of Tx402f and Rx404f are used independently of each other to form the four-wire communication path.

The second command transmitter/receiver 40fm in the master projector 100fm is connected to the second command transmitter/receiver 40f of the projector 100f when the cable 80 is connected to the connector 44fm and the connector 42f in the projector 100f. The second command transmitter/receiver 40f in the projector 100f is connected to the second command transmitter/receiver 40f' in the projector 100f' when the cable 80' is connected to the connector 44f and an unillustrated connector in the projector 100f'. Thus, the projectors 100fm, 100f, and 100f' (second command transmitter/receivers 40fm, 40f and 40f) are daisy-chained via the cables 80 and 80'.

FIG. 9 shows an illustrative pin arrangement of the RJ-45 connector connected to the LAN cable. The arrangement of the pin numbers A and B corresponds to the case of the cross cable. The broken line indicates wiring in case of the straight cable. RTCMD_TXD+ and RTCMD_TXD−, and RTCMD_RXD+ and RTCMD_RXD− are signals that include both the real-time command and the general command in the second command transmitter/receivers 40m, 40, and 40'.

This full-duplex communication is performed using totally five lines, or four (two sets) of differential pair lines and one GND line. For example, as illustrated in FIGS. 8 and 9, the first and second pins are used as one differential pair pin, the third and sixth pins are used as another differential pair pin, and the fourth pin is used as the GND pin.

In the full-duplex multipoint communication, Rx404f in the other projector 100f is connected to Tx402fm in the master projector 100fm, and Tx402f in the other projector f100 is connected to Rx404fm in the master projector 100fm. Hence, the master projector 100m and the projector 100 directly connected to the master projector 100m are connected by connecting two pairs of differential pairs to first, second, third, and sixth pins which are cross-connected, and by connecting the GND line to the fourth pin or another pin which is straight-connected. The cross cable uses the cable 80. Further, the connection between the projector 100 and the projector 100' uses the straight cable. Thereby, Rx404f and Tx404f in the other projectors 100f and 100 are connected to Tx402fm and Rx404fm in the master projector 100fm, respectively. Thereby, the full-duplex communication can be easily configured.

When an unillustrated cable connected to the connector of the projector 100f is connected to a connector in another unillustrated projector to perform the daisy chain connection, the number of connected projectors can be easily increased by using the straight cable as the cable.

Similarly, when the RS-232C cable is used, the full-duplex communication is performed by connecting two differential pair lines for the full-duplex communication and the GND line to the straight-connected portion in the cross cable.

As described above, this embodiment daisy-chains the master projector and the N−1 other projectors by the N−1 cables. The real-time command for requesting the periodic operation (processing) for each frame from the master projector to another projector and the general command for requesting the operation (processing) at irregular timings are transmitted for each frame. This configuration can cause the N projectors to execute a plurality of different command processes (real-time command processing and general command processing) while reducing the number of cables required to connect the N projectors.

The command is transmitted and received by the serial communication such as RS422 or RS485 and the half-duplex or full-duplex multipoint communication. In this time, by using the eight-wire LAN cable or nine-wire RS-232C cable, the multi-display system that saving wires and space can be configured.

Second Embodiment

Figure 10:
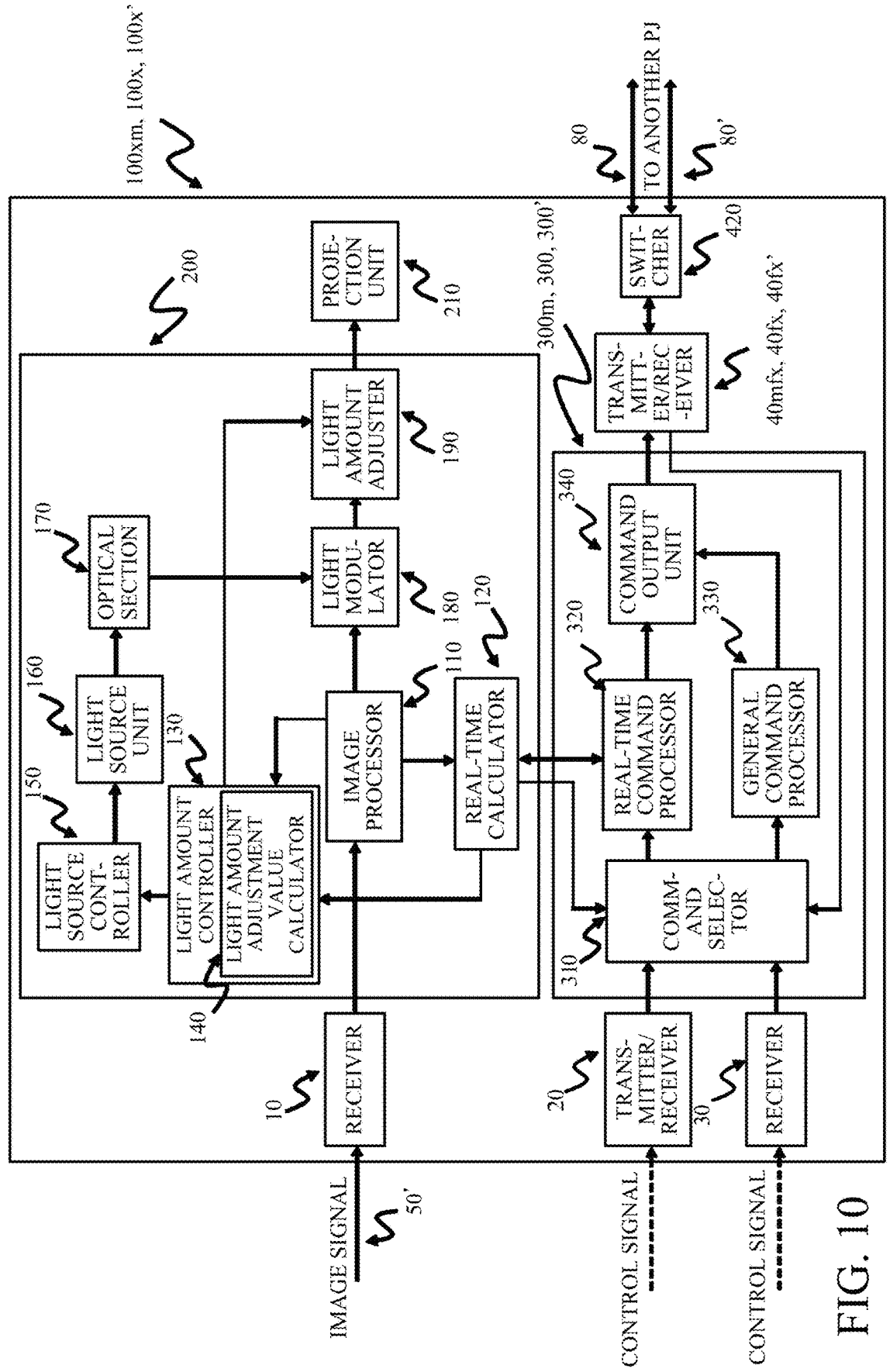
FIG. 10 is a block diagram illustrating details of an internal configuration of each projector according to a second embodiment of the invention.

FIG. 10 illustrates a configuration of each of projectors 100xm, 100x, and 100x' according to a second embodiment of the present invention. Those elements which perform operations similar to those of the first embodiment will be designated by the same reference numerals as those of the first embodiment, and a description thereof will be omitted. The projectors 100xm, 100x, and 100x' according to this embodiment differ from those of the first embodiment in that the projectors 100xm, 100x, and 100x' have a switching unit 420 connected to second command transmitter/receivers 40mfx, 40fx, and 40fx'.

Figure 11B:
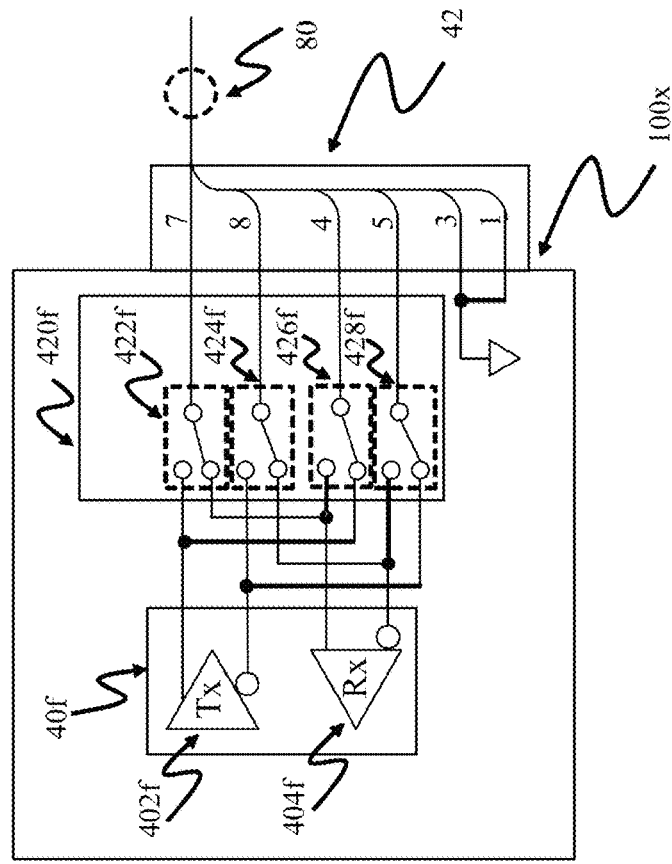
FIG. 11B illustrates a connection for the full-duplex communication of another projector according to the second embodiment.
Figure 11A:
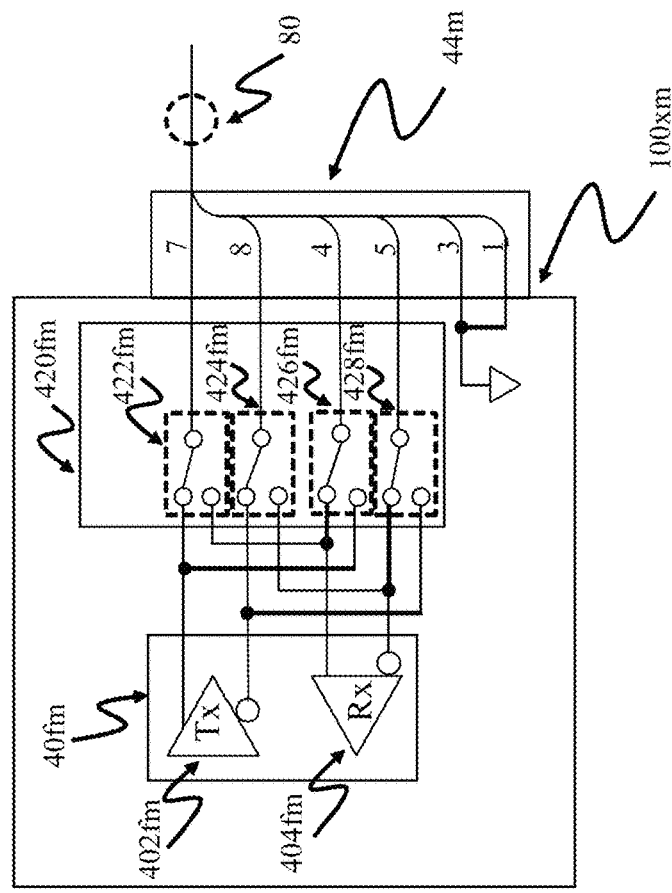
FIG. 11A illustrates a connection for a full-duplex communication of a first projector according to a second embodiment.

FIGS. 11A and 11B illustrate an illustrative connection for the full-duplex communication according to this embodiment. FIG. 11A illustrates a connection example in the master projector 100xm, and FIG. 11B illustrates a connection example in the other projectors 100x and 100x'. The symbol f indicates that the component performs the full-duplex communication.

In the master projector 100xm illustrated in FIG. 11A, the second command transmitter/receiver 40fm communicates with the projector 100x via the switching unit 420fm. Switches 422fm, 424fm, 426fm, and 428fm in the switching unit 420fm switch pins of the connector 44m connected to a transmitter (Tx) 402fm and a receiver (Rx) 404fm.

Similar to the first embodiment, even this embodiment sets signals that include both the real-time command and the general command in the second command transmitter/receiver 40fm to RTCMD_TXD+ and RTCMD_TXD−, and RTCMD_RXD+ and RTCMD_RXD−. The full-duplex communication is performed using totally five lines or four (two pairs) differential pair lines and one GND line.

FIG. 12 shows an illustrative pin arrangement of the RJ-45 connector connected to the LAN cable. The arrangement of the pin numbers A and B illustrates a case of the cross cable. The broken line indicates wiring in case of the straight cable.

In the example of FIG. 12, RTCMD_RXD+ and RTCMD_RXD− are connected to the differential pair pins of the fourth and fifth pins, which are straight-connected, and RTCMD_TXD+ and RTCMD_TXD− are connected to the differential pair pins of the seventh and eighth pins. The first and third pins are used as the GND pins. This connection corresponds to each switch in the switching unit 420fm in FIG. 11A connected to the upper port.

In the full-duplex multipoint communication, Rx404f in the other projector 100x is connected to Tx402fm in the master projector 100xm, and Tx402f in the other projector 100x is connected to Rx404fm in the master projector 100xm. Since the cable is the straight cable, Tx402fm in the master projector 100xm is connected to Rx402f in the other projector 100x, and Rx404fm in master projector 100xm is connected to Rx404f in the other projector 100x.

Hence, in the other projector 100x according to this embodiment, as illustrated in FIG. 11B, the switches 422f, 424f, 426f, and 428f in the switching unit 420f connected to the second command transmitter/receiver 40f are switched to switch the pins connected to Tx402f and Rx404f in the connector 42. More specifically, as illustrated, the switches 422f, 424f, 426f, and 428f are connected to the lower ports. Thereby, RTCMD_RXD+ and RTCMD_RXD− are output to the differential pair pins of the seventh and eighth pins, and RTCMD_TXD+ and RTCMD_TXD− are output to the differential pair pins 2 of the fourth and fifth pins. Thereby, Rx404f in the other projector 100x is connected to Tx402fm in the master projector 100fm, and Tx402f in the other projector 100x is connected to Rx404fm in the master projector 100xm. As a result, the master projector 100xm and the other projector 100x can normally perform the full-duplex communication.

The cable 80' connected to the connector 44 in the projector 100x is connected to an unillustrated connector in the other projector 100x' to form the daisy chain connection, and the switching unit 420f in the other connected projector 100x' is similarly set. Thereby, the full-duplex communication can be performed between the projectors 100x and 100x'.

Each differential pair line may be connected with the cross connection pin, and the full-duplex communication can be performed by setting the switching units 420fm, 420f, and 420f' in the master projector 100xm and the other projectors 100x and 100x' (to connect 420fm to the lower port and to connect 420f to the upper port and 420f' to the upper port).

In using the RS-232C cable, similarly, the full-duplex communication can be correctly connected by setting the switching units 420fm, 420f, and 420f.

As described above, even this embodiment daisy-chains the master projector and N−1 other projectors by N−1 cables. Then, a real-time command and a general command are transmitted from the master projector to other projectors for each frame. The connections required for the full-duplex multipoint communication can be performed by setting the switching unit in each projector. Hence, even this embodiment can cause the N projectors to execute a plurality of different command processes (real-time command processing and general command processing) while reducing the number of cables required to connect the N projectors.

The commands are transmitted and received by the serial communication such as RS422, RS485, or the like, by the full-duplex multipoint communication. At this time, a multi-display system that saves wires and space can be configured by using the eight-wire LAN cable or the nine-wire RS-232C cable.

Third Embodiment

Figure 13:
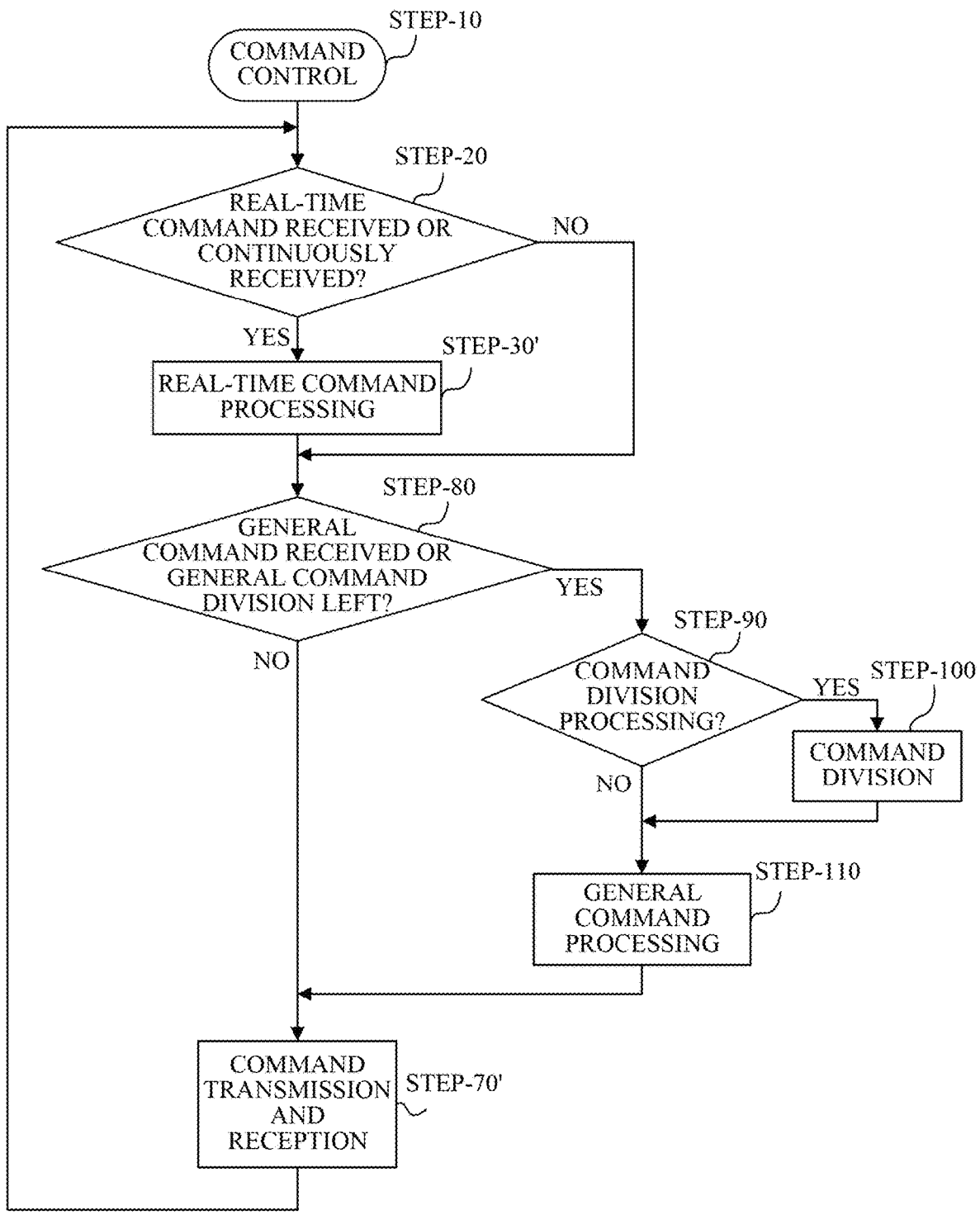
FIG. 13 is a flowchart showing processing of a command controller according to a third embodiment of the present invention.

A third embodiment according to the present invention is different from the first embodiment in operations of the command controllers 300m, 300, and 300'. A flowchart in FIG. 13 illustrates operations of the command controllers 300m, 300, and 300' in the third embodiment. Those elements which perform operations similar to those of the first embodiment will be designated by the same reference numerals as those of the first embodiment, and a description thereof will be omitted.

In this embodiment, if no real-time command is received in the Step-20, the command controllers 300m, 300, and 300' confirm in the Step-80 whether a general command has been received or whether there is any undivided portion. When the real-time command is received in the Step-20, the Step-30' performs real-time command processing similar to the Step-30 of the first embodiment, but the existence of the real-time command to be transmitted or received is stored in an unillustrated memory.

Next, the command controllers 300m, 300, and 300' confirm in the Step-80 whether or not a general command has been received or whether there is any undivided portion. When no general command is received and there is no undivided portion in the general command, the command controllers 300m, 300, and 300' execute transmission or reception processing of the real-time command stored in the memory in the Step-70'. If the general command is received in the Step-80 or if there is any undivided portion in the general command, the command controllers 300m, 300, and 300' proceed to the Step-110 via the Step-90 and 100.

The Step-110' performs the general command processing similar to Step-110 in the first embodiment, but does not transmit or receive the general command, and stores in the unillustrated memory the fact that there is a general command to be transmitted or received.

Next, where there is a real-time command stored in the memory in the Step-70', the real-time command and the general command are transmitted or received.

Figure 14:
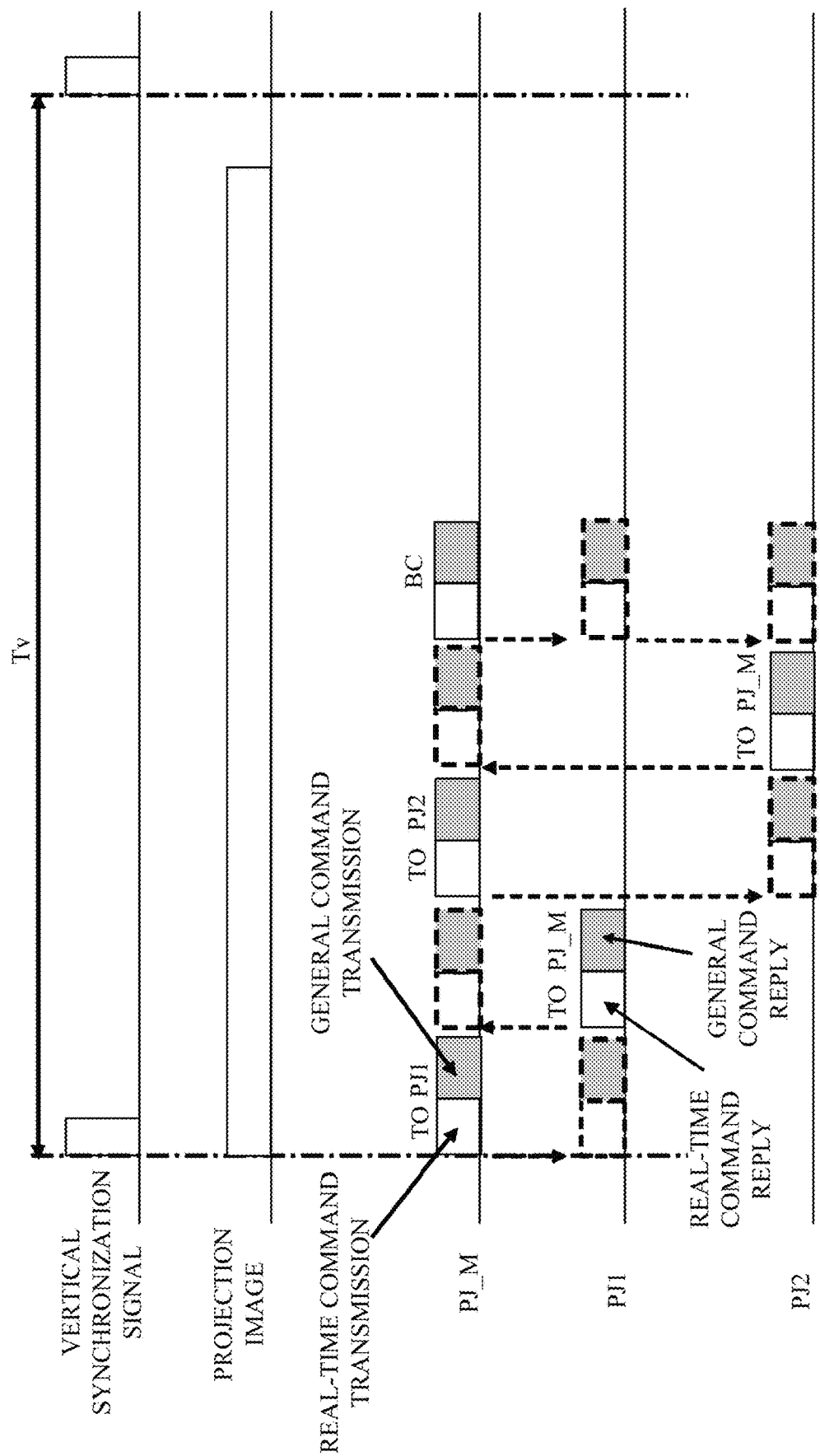
FIG. 14 illustrates timings of a real-time command and a general command according to the third embodiment.

FIG. 14 illustrates transmission and reception timings when both the real-time command and the general command are received. The master projector (100m) PJ_M transmits the real-time command and the general command to the other projector (100) PJ1 continuously (in other words, by combining them) in this order, as indicated by a solid-white frame and a solid-gray frame. When PJ1 receives these commands, it returns a real-time command reply and a general command reply to PJ_M as replies to the commands as shown by the solid-white frame and the solid-gray frame.

Next, PJ_M continuously transmits the real-time command and the general command to the other projector (100') PJ2 in this order, as shown by the solid-white frame and the solid-gray frame. When PJ2 receives these commands, it returns the real-time command and general command replies to PJ_M as replies to these commands as shown by the solid-white frame and the solid-gray frame.

PJ_M also continuously transmits to PJ1 and PJ2 information to be transmitted to PJ1 and PJ2 on the target luminance value and the general command to all the other projectors in this order after combining them as shown by a solid-white frame and a solid-gray frame.

When there are a plurality of general commands for PJ1 and PJ2 in the Step-90, and it is determined that the real-time command processing and the general command processing are not completed within one frame where these general commands are added to the real-time command, the command controller 300m divides the command in the Step-100. In this case, the command controller 300m combines the undivided portion, which is part of the general command for PJ1 and PJ2, with the real-time command for PJ1 and PJ2 in the next frame, and transmits the result to PJ1 and PJ2. If it is determined that the general command processing is not completed even in the next frame, the command controller 300m combines the general command with a real-time command for PJ1 and PJ2 in the next frame, and transmits the result to PJ1 and PJ2.

Where there is a specific general command to be transmitted to another specific projector that does not execute the real-time command processing, such as PJ1, among PJ1 and PJ2, the command controller 300m transmits to PJ1 only a specific general command after finishing transmitting the real-time command and the general command to PJ1 and PJ2.

This embodiment combines and transmit the real time command and the general command from the master projector 100m to the other projectors 100 and 100', and divides the general command so that the real time command processing and the general command processing are completed within one frame. Therefore, when the combined real-time command and the general command are transmitted and received, the real-time command processing and the general command processing can be reliably executed.

The communication system and the cables and connectors used for this embodiment are the same as those in the first and second embodiments.

As described above, even this embodiment daisy-chains the master projector and N−1 other projectors by the N−1 cables. Then, a real-time command and a general command are combined with each other and transmitted from the master projector to the other projectors for each frame. Even this embodiment can cause the N projectors to execute a plurality of different command processes (real-time command processing and general command processing) while reducing the number of cables required for connecting the N projectors.

Fourth Embodiment

Figure 15:
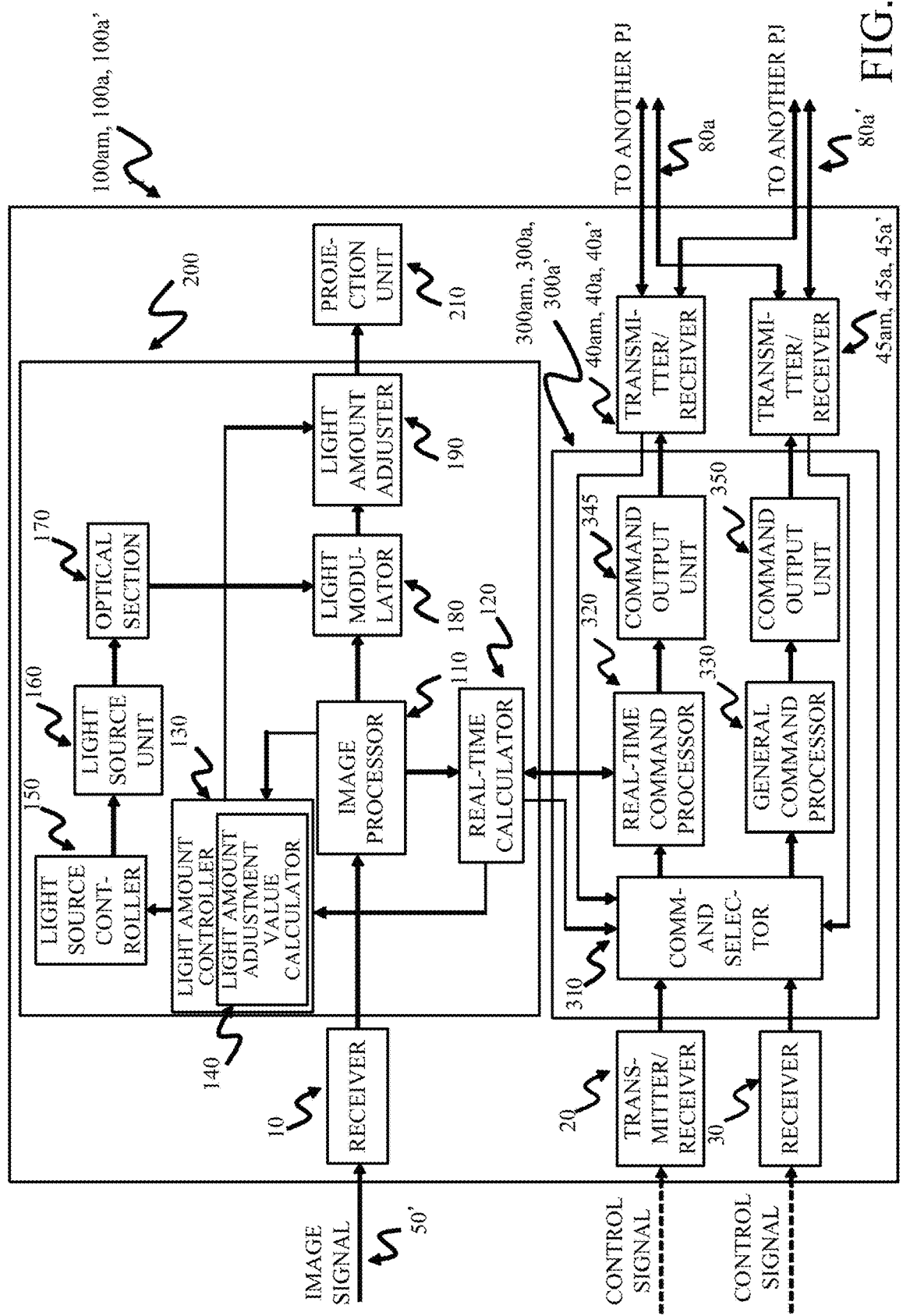
FIG. 15 is a block diagram illustrating details of an internal configuration of each projector according to a fourth embodiment of the present invention.

FIG. 15 illustrates a configuration of each of projectors 100am, 100a, and 100a' according to a fourth embodiment of the present invention. Those elements which perform operations similar to those of the first embodiment will be designated by the same reference numerals as those of the first embodiment, and a description thereof will be omitted.

The projectors 100am, 100a, and 100a' according to this embodiment include a real-time command output unit 345 for the real-time command processor 320 in the command controllers 300am, 300a, and 300a'. A second command transmitter/receivers (second transmitter) 40am, 40a, or 40a' for the real-time command is provided to the real-time command output unit 345. A general command output unit 350 is provided for the general command processor 330 in the command controllers 300am, 300a, and 300a'. The second command transmitter/receivers (first transmitter) 45am, 45a, and 45a' for the general command are provided for the general command output unit 350. Thereby, the real-time command and the general command can be communicated independently of each other.

For the second command transmitter/receivers 40am, 40a, and 40a' for the real-time command and the general command output unit 350, the second command transmitter/receivers 45am, 45a, and 45a' for the general command are compatible with the serial communication such as RS-422 and RS-485. The other projectors are connected in the daisy chain using the cables 80a and 80a'. The cables and connectors used are, for example, the eight-wire LAN cable and RJ-45 connector or the nine-wire RS-232C cable and Dsub connector. Wiring for communicating the real-time command and the general command independently of each other is provided in one LAN cable or RS-232C cable.

Figure 16:
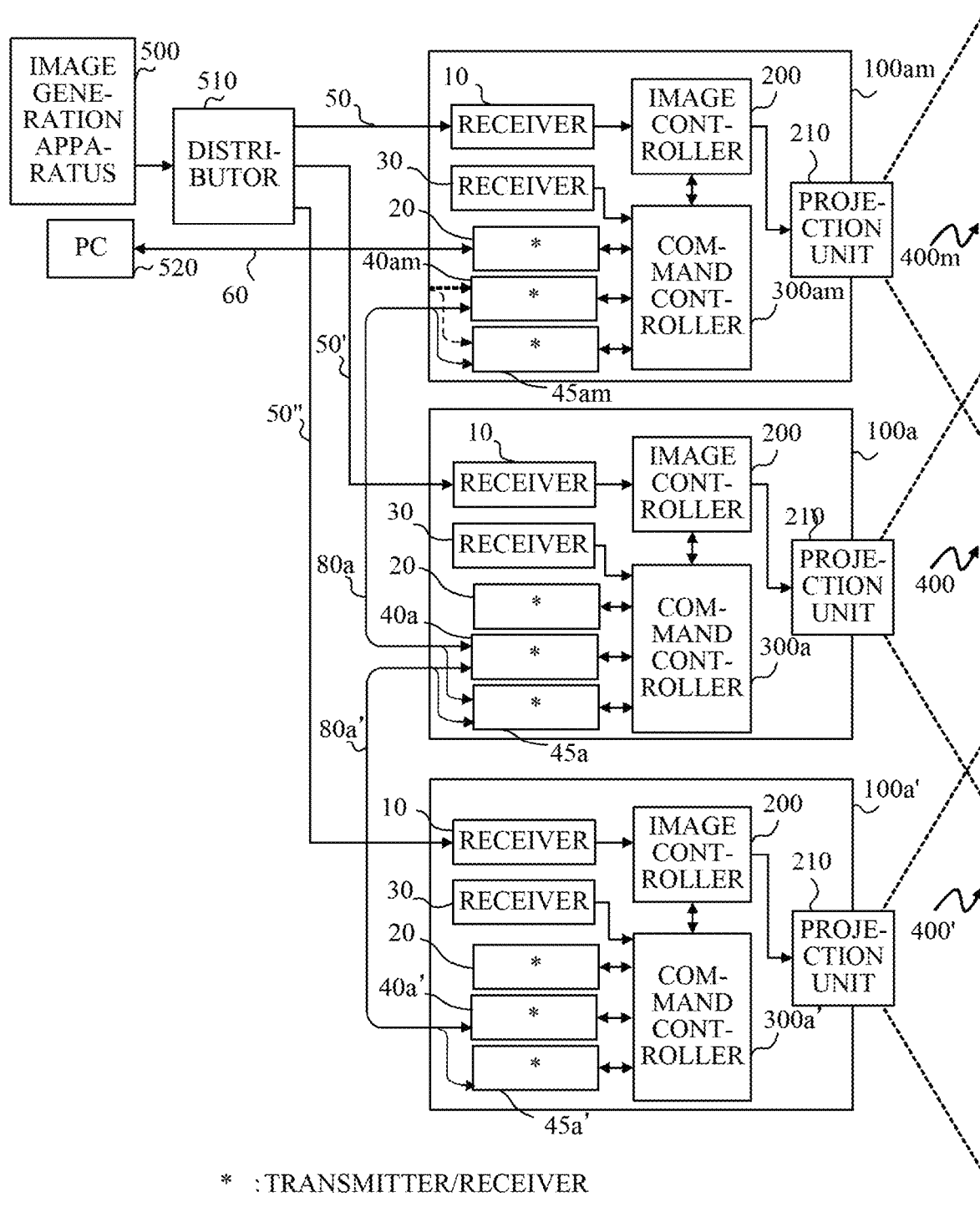
FIG. 16 is a block diagram illustrating internal configurations of a plurality of projectors according to the fourth embodiment.

FIG. 16 illustrates details of the internal configurations of the projectors 100am, 100a, and 100a'. The second command transmitter/receivers 40am and 45am in the master projector 100am are connected to the second command transmitter/receivers 40a and 45a in the other projector 100a via the single cable 80a. The second command transmitter/receivers 40a and 45a in the projector 100a are further connected to the second command transmitter/receivers 40a' and 45a' in the other projector 100a' via the single cable 80a'. Thus, the projectors 100am, 100a, and 100a' are daisy-chained.

Figure 17:
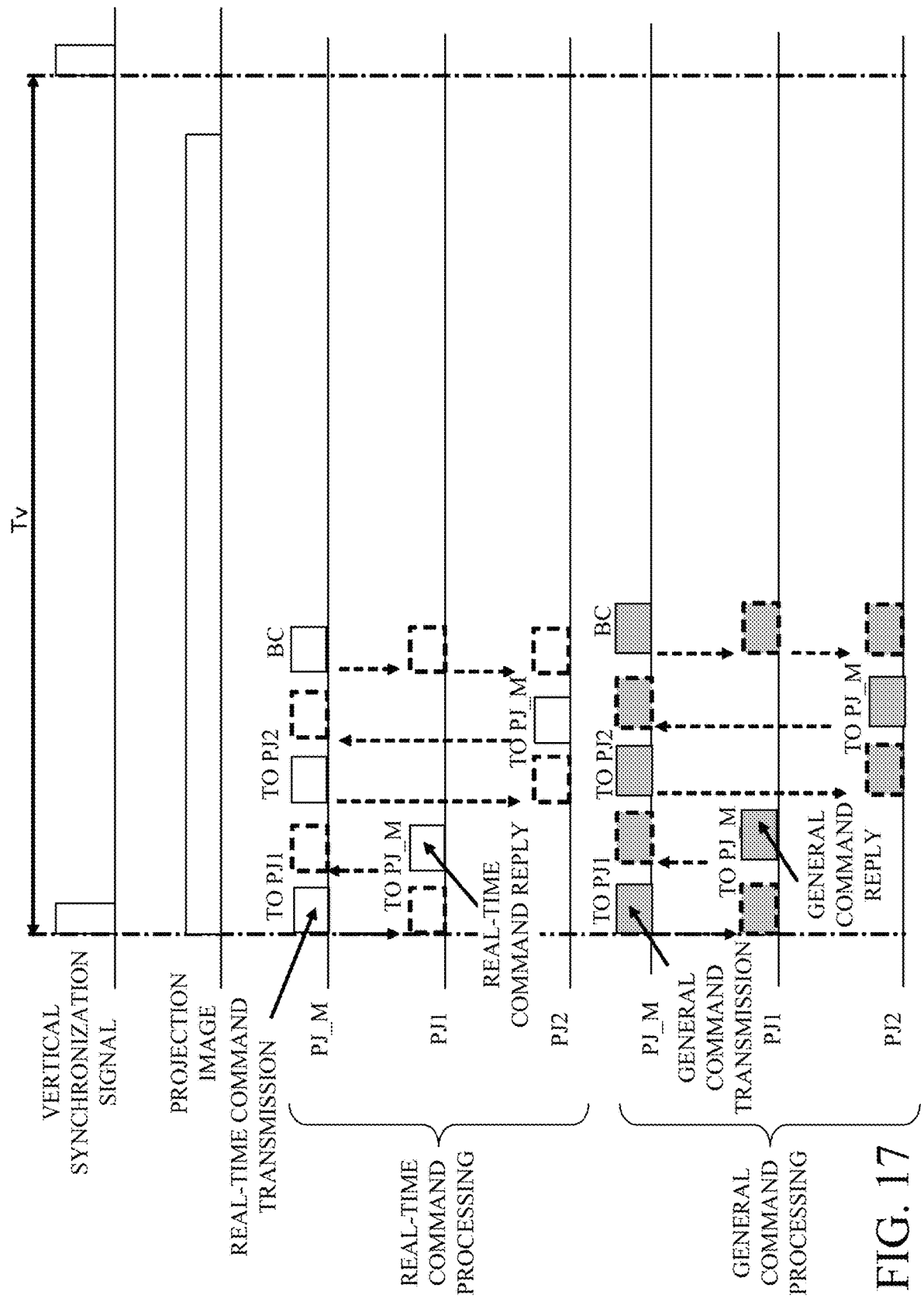
FIG. 17 illustrates timings of a real-time command and a general command according to the fourth embodiment.

FIG. 17 illustrates transmission and reception timings of the real-time command and the general command. This embodiment performs the real-time command processing illustrated in the middle part of the figure and the general command processing illustrated in the lower part independently within one frame of the period Tv of the vertical synchronization signal. Since the transmission and reception of each command and the BC transmission are the same as those of the first embodiment, a description thereof will be omitted.

This embodiment does not transmit the general command in addition to the real-time command, and thus can perform the real-time command processing using the entire time in one frame. Hence, this embodiment can connect more projectors to perform the real-time command processing, and easily handle a high-speed image signal in which the time of one frame is short. Since the entire time in one frame can be used for the general command processing, it is possible to transmit more general commands to more projectors and to control the operation of each projector.

Figure 18:
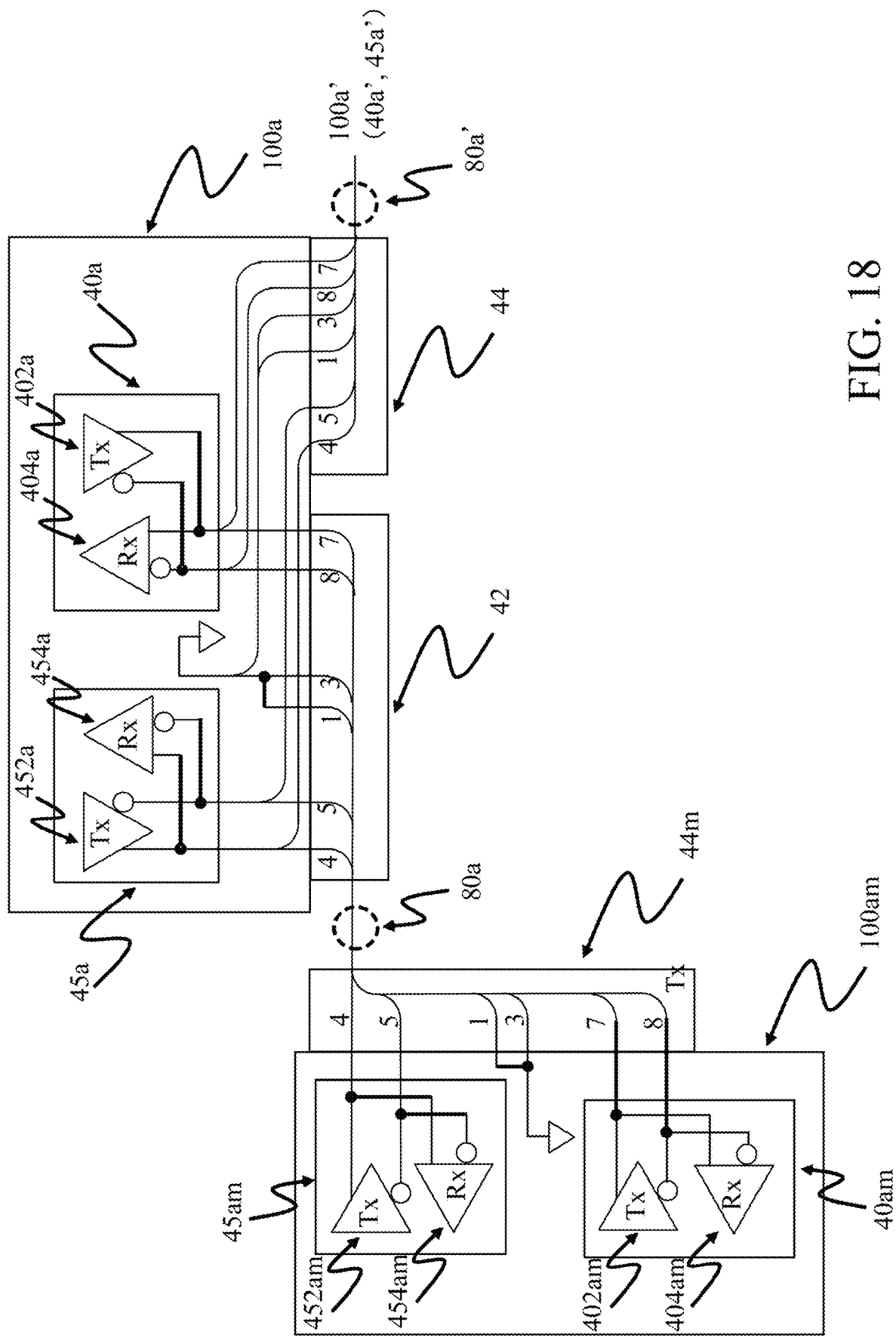
FIG. 18 illustrates a connection for a half-duplex communication according to the fourth embodiment.

FIG. 18 illustrates the half-duplex multipoint communication in this embodiment. The second command transmitter/receivers 40am and 45am that perform the half-duplex communication in the master projector 100am include the transmitters (Tx) 402am and 452am and receivers (Rx) 404am and 454am, respectively. Similarly, the second command transmitter/receivers 40a and 45a that perform the half-duplex communication in the other projector 100a include Tx402a and 452a and Rx404a and 454a, respectively. The same applies to the other projector 100a'.

The second command transmitter/receivers 40am and 45am in the master projector 100am are connected to the second command transmitter/receivers 40a and 45a in the projector 100a via the connector 44m, the cable 80a, and the connector 42 in the other projector 100a. Similarly, the second command transmitter/receivers 40a and 45a in the projector 100a are connected to the second command transmitter/receivers 40a' and 45a' in the projector 100a' via the connector 44, the cable 80a', and an unillustrated connector in the other projector 100a'.

FIG. 19 shows an illustrative pin arrangement of an RJ-45 connector connected to the LAN cable. As described above, there are two types of LAN cables or the straight cable and the cross cable. The arrangement of the pin numbers A and B in FIG. 19 illustrates a case of the cross cable. The broken line indicates wiring in case of the straight cable. In the column of 10BASE/100BASE-TX, the signal name is described.

The first pin TD+ and the second pin TD− of the pin number A indicate a differential pair signal as a transmission signal, and the third pin RD+ and the sixth pin RD− indicate a differential pair signal as a reception signal. Each differential pair line is configured so that the characteristic impedance is 100Ω. In the cross cable, the first pin of the pin number A is connected to the third pin of the pin number B, the second pin is connected to the sixth pin, the third pin is connected to the first pin, and the sixth pin is connected to the second pin. The fourth and fifth pins and the seventh and eighth pins are unused pins as differential pair pins and straight-connected.

This embodiment sets the signals in the second command transmitter/receivers 40am, 40a, and 40a' for the real-time command and the second command transmitter/receivers 45am, 45a, and 45a' for the general command to RT_TRD+ and RT_TRD− and CMD_TRD+ and CMD_TRD−, respectively.

These half-duplex communication is performed using totally five lines of four (two sets) of differential pair lines and one GND line. Two pairs of differential pairs are connected to fourth, fifth, seventh, and eighth pins which are straight-connected. The GND line is connected to the paired pins (the first and third pins or the second and sixth pins) which are cross-connected. In this way, by connecting totally six wires for the half-duplex communication and the GND, it is possible to perform the half-duplex communication using either the straight cable or the cross cable and the wiring freedom degree is improved.

The differential pair lines for the real-time command and the general command only may be connected to the differential pair pins that are straight-connected, and the connection combination between each differential pair line and the differential pair pin and (+ and −) code switching may be switched.

Similarly, where the RS-232C cable is used, both the straight cable and the cross cable are available by connecting the differential pair line for the half-duplex communication to the straight connection and by connecting the GND line to the cross line.

As described above, this embodiment can communicate the real-time command and the general command independently of each other, and communicate these commands among the projectors via a single cable. Thereby, the master projector and the N−1 other projectors can be daisy-chained by the N−1 cables.

Therefore, this embodiment can cause the N projectors to execute a plurality of different command processes (real-time command processing and general command processing) while reducing the number of cables required to connect the N projectors.

Fifth Embodiment

Figure 20:
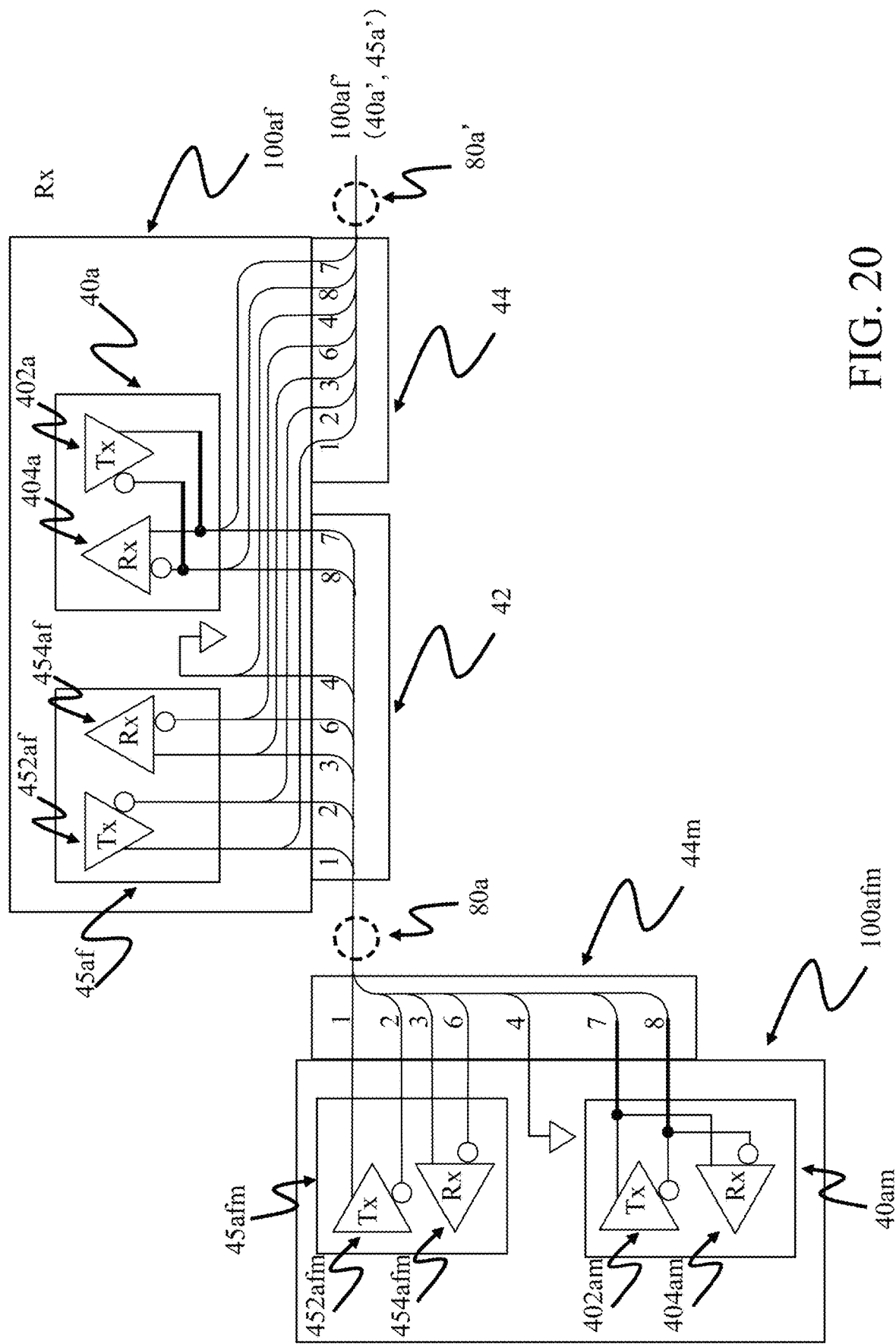
FIG. 20 illustrates connections for the full-duplex communication and half-duplex communication according to a fifth embodiment of the present invention.

FIG. 20 illustrates a connection example between second command transmitter/receivers 40am, 40a, and 40a' for the real-time command configured to perform the half-duplex communication and second command transmitter/receivers 45afm, 40fa, and 40fa' for the general command configured to perform the full-duplex communication according to the fifth embodiment of the present invention.

In FIG. 20, f is added to the reference numerals of the components relating to the full-duplex communication and each projector.

The second command transmitter/receiver 40am for the real-time command in the master projector 100afm includes a transmitter (Tx) 402am and a receiver (Rx) 404am, and the second command transmitter/receiver 45afm for the general command includes Tx452afm and Rx454afm. Similarly, the second command transmitter/receiver 40a for the real-time command in the other projector 100af includes Tx402a and Rx404a, and the second command transmitter/receiver 45af for the general command includes Tx452af and Rx454af. The same applies to other projectors 100af.

The second command transmitter/receivers 40am and 45afm in the master projector 100afm are connected to the second command transmitter/receivers 40a and 45af in the projector 100af via the connector 44m, the cable 80a, and the connector 42 in the other projector 100af. The second command transmitter/receivers 40a and 45af in the projector 100af are connected to the second command transmitter/receivers 40a' and 45af' in the projector 100af' via the connector 44, the cable 80a', and an unillustrated connector in the other projector 100af'. Thereby, the projectors 100afm, 100af, and 100af are daisy-chained. The connector and the cable are, for example, the eight-wire LAN cable and RJ-45 connector, or the nine-wire RS-232C cable and Dsub connector.

FIG. 21 shows an illustrative pin arrangement of the RJ-45 connector connected to the LAN cable. The arrangement of pin numbers A and B illustrates a case of the cross cable. The broken line indicates wiring in case of the straight cable. The signal name is described in the column of 10BASE/100BASE-TX. RT_TRD+ and RT_TRD− represent signals of the real-time command transmitted in the half-duplex communication, and CMD_TXD+ and CMD_TXD− and CMD_RXD+ and CMD_RXD− represent signals of the general command transmitted in the full-duplex communication. The differential pair line for the half-duplex communication is connected to the fourth and fifth pins or seventh or eighth pins which are straight-connected, and the GND line is connected to any of the straight-connected pins. On the other hand, the differential pair line for the full-duplex communication is connected to the first and third pins and third and sixth pins which are cross-connected.

In the full-duplex multipoint communication, Rx454af in the other projector 100af is connected to Tx452af in the master projector 100afm, and Tx452af in the other projector 100af is connected to Rx454afm in the master projector 100afm. Hence, when two sets of differential pair lines for the full-duplex communication are connected to first, second, third, and sixth pins that are cross-connected and the cross cable is used for the cable 80a, Rx454af and Tx452af in the other projector 100af are connected to Tx452afm and Rx454afm in the master projector 100afm. Thereby, the full-duplex communication can be easily performed. Since the differential pair line and the GND line for the half-duplex communication are respectively straight-connected, the half-duplex communication between the master projector 100afm and the other projector 100af is also normally performed.

When an unillustrated cable connected to the connector in the projector 100af is connected to a connector in another unillustrated projector for the daisy chain connection, the straight cable can be used for the cable. Thereby, the number of projectors can be easily increased which are connected to normally perform the full-duplex communication and the half-duplex communication.

This embodiment has described the second command transmitter/receivers 45am, 45a, and 45a' for the general command performing the full-duplex communication. The first command transmitter/receiver 20 that receives the general command from the PC or the like often performs the LAN communication by Ethernet or serial communication using RS-232C or the like, and these communications are full-duplex communications. The general command is also transmitted and received among projectors by the full-duplex communication, so that all general commands can be easily transmitted and received by the full-duplex communication.

Since the full-duplex communication allows a higher-speed communication than the half-duplex communication, the real-time command may be transmitted and received by the full-duplex communication, and the general command may be transmitted and received by the half-duplex communication. In this case, the communication time of the real-time command can be reduced, and the number of connected projectors can be increased, so that the system is compatible with a higher-speed image signal.

Similarly, even when the RS-232C cable is used, it is possible to transmit and receive a plurality of different commands to a plurality of projectors by connecting two differential pair lines for the full-duplex communication to the cross-connected portion in the cable and by connecting the differential pair line for the half-duplex communication and the GND line to the straight-connected portion.

As described above, this embodiment communicates the real-time command and the general command through totally seven communication lines that include four communication lines for the full-duplex communication, two communication lines for the half-duplex communication, and the GND line. Then, the communication line for the full-duplex communication is connected to the cross connection of the cross cable, and the communication line for the half-duplex communication and the GND line are connected to the straight connection. Thereby, the real-time command and the general command can be communicated independently of each other, and these two independent commands can be communicated via a single LAN cable or RS-232C cable. Hence, the master projector and the N−1 other projectors can be daisy-chained by the N−1 cables. As a result, it is possible to cause the N projectors to execute a plurality of different command processes (real-time command processing and general command processing) while reducing the number of cables required to connect the N projectors.

Sixth Embodiment

Figure 22:
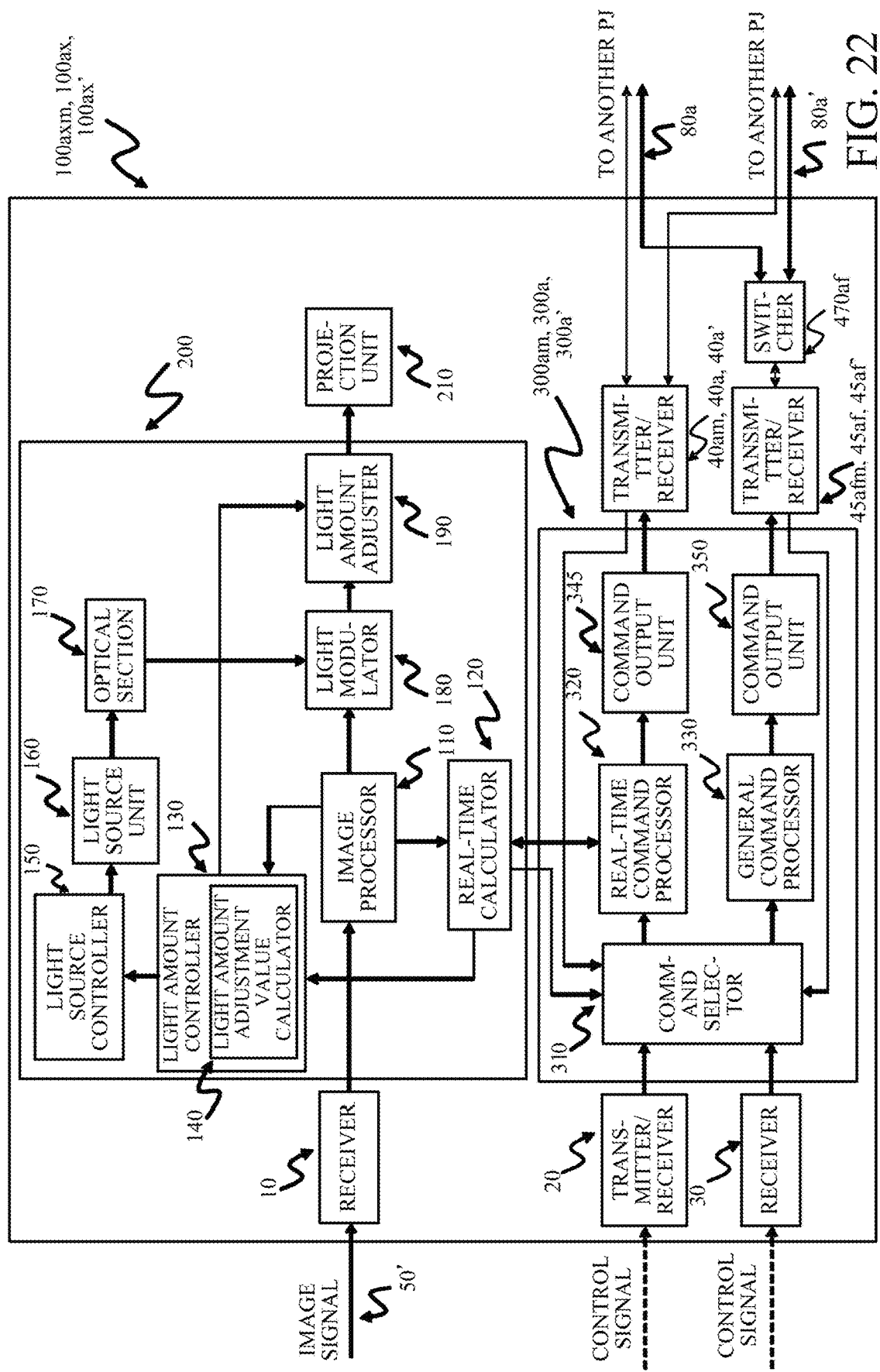
FIG. 22 illustrates details of an internal configuration of each projector according to a sixth embodiment of the invention.
Figure 23:
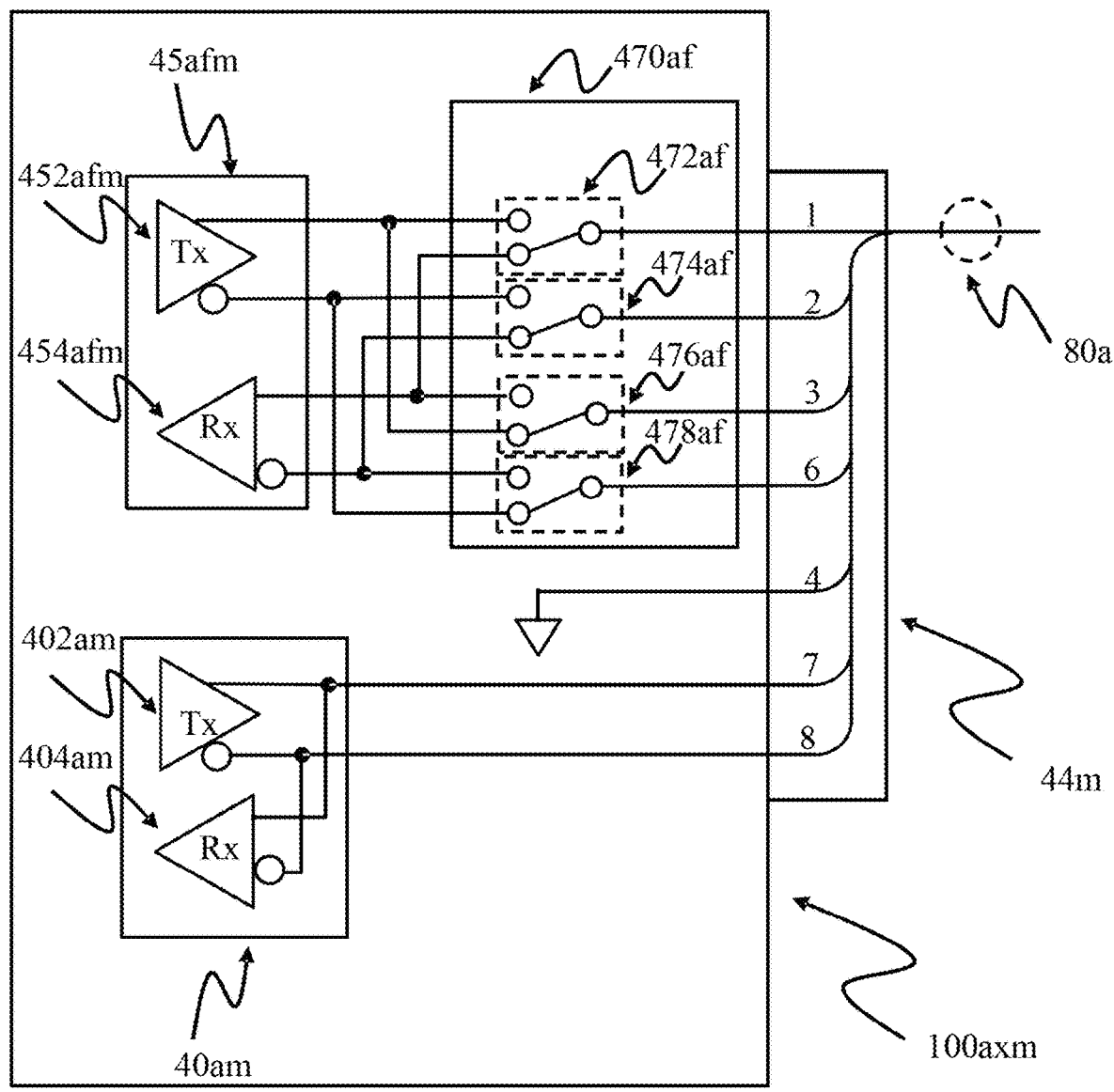
FIG. 23 illustrates connections for the full-duplex communication and the half-duplex communication of a first projector according to the sixth embodiment.

FIG. 22 illustrates a configuration of each of projectors 100axm, 100ax, and 100ax' according to a sixth embodiment of the present invention. Those elements which perform operations similar to those of the first embodiment will be designated by the same reference numerals as those of the first embodiment, and a description thereof will be omitted. The projectors 100axm, 100ax, and 100ax' according to this embodiment have a switching unit 470af connected to the second command transmitter/receivers 45afm, 45fa, and 45fa' for the general command. FIG. 23 illustrates a connection example for the full-duplex communication in the master projector 100axm according to this embodiment. The symbol f represents the component performing the full-duplex communication.

Switches 472af, 474af, 476af, and 478af in the switching unit 470af switch pins of the connector 44m to be connected to the transmitter (Tx) 452afm and the receiver (Rx) 454afm in the second command transmitter/receiver 45afm.

FIG. 24 shows an illustrative pin arrangement of an RJ-45 connector connected to the LAN cable. The arrangement of pin numbers A and B illustrates a case of the cross cable. The broken line indicates wiring in case of the straight cable. Signals in the second command transmitter/receiver 45afm for the general command which perform the full-duplex communication are set to CMD_TXD+ and CMD_TXD− and CMD_RXD+ and CMD_RXD−. Signals in the second command transmitter/receiver 40am for the real-time command which performs the half-duplex communication are set to RT_TRD+ and RT_TRD−. The connector 44m is connected to totally seven lines, such as two (four) differential pair lines for the full-duplex communication, two (one set) differential pair line for the half-duplex communication, and one GND line.

In FIG. 24, the differential pair line for the full-duplex communication is connected to the first, second, third, and sixth pins which are cross-connected, and the differential pair line for the half-duplex communication is connected to the seventh and eighth pins which are straight-connected. The GND line is connected to the fourth pin which is straight-connected.

In the full-duplex multipoint communication, Rx454af in the other projector 100ax is connected to Tx452af in the master projector 100axm, and Tx452af in the other projector 100ax is connected to Rx454afm in the master projector 100axm. However, when the straight cable is used for the cable 80a, Tx452af in the other projector 100ax is connected to Tx452af in the master projector 100axm, and Rx454af in the master projector 100axm is connected to Rx454af in the other projector 100ax.

Accordingly, the master projector 100axm according to this embodiment switches the switches 472af, 474af, 476af, and 478af in the switching unit 470af to switch the pin to be connected to Tx452afm and Rx454afm in the connector 44m. More specifically, by connecting each switch to the lower port as illustrated in the figure, CMD_TXD+ and CMD_TXD− are output to the differential pair pins of the third and sixth pins, and CMD_RXD+ and CMD_RXD− are output to the differential pair pins of the first and second pins. Thereby, Rx454af in the other projector 100ax is connected to Tx452afm of master projector 100axm, and Tx452af of another projector 100ax is connected to Rx454afm in the master projector 100axm. As a result, the master projector 100axm and the other projector 100ax can normally perform the full-duplex communication using the straight cable.

Since the differential pair line for the half-duplex communication and the GND line are connected to the straight-connected pin, the master projector 100axm and the other projector 100ax can also normally perform the half-duplex communication.

The cable 80a' connected to the connector 44 in the projector 100ax is connected to an unillustrated connector in the other projector 100ax' to form the daisy chain connection. The switching unit 470af in the other projector 100ax' is set in accordance with the type of cable (cross cable or straight cable) to be used, so as to normally perform the full-duplex communication. Thereby, the full-duplex communication can be performed between the projectors 100ax and 100ax' regardless of the type of cable to be used.

Each differential pair line may be connected with a cross-connected pin, and even in this case the full-duplex communication is performed by setting the switching units 420fm, 420f, and 420f in the master projector 100xm and the other projectors 100x and 100x'.

Even when the RS-232C cable is used, a differential pair line for the full-duplex communication is connected to the cross-connected cable, and the differential pair line for the half-duplex communication and GND line are connected to the straight connection. Then, the switching unit 470a is set in accordance with the type of the cable. Thereby, the full-duplex communication and the half-duplex communication can be normally performed.

As described above, this embodiment transmits the real-time command and the general command in totally seven communication lines that include four communication lines for the full-duplex communication, two communication lines for the half-duplex communication, and the GND line, and includes a switching unit configured to switch the transmission and reception directions in the full-duplex communication. This embodiment connects the communication line for the full-duplex communication to the cross connection of the cross cable, and the communication line for the half-duplex communication and the GND line to the straight connection, sets the switching unit in accordance with the type of cable, and normally performs the full-duplex communication and the half-duplex communication regardless of the type of cable to be used.

Thereby, the real-time command and the general command can be communicated independently of each other, and these two independent commands can be communicated via a single LAN or RS-232C cable. Hence, the master projector and the N−1 other projectors can be daisy-chained by the N−1 cables. As a result, it is possible to cause the N projectors to execute a plurality of different command processes (real-time command processing and general command processing) while reducing the number of cables required to connect the N projectors.

Seventh Embodiment

Figure 25:
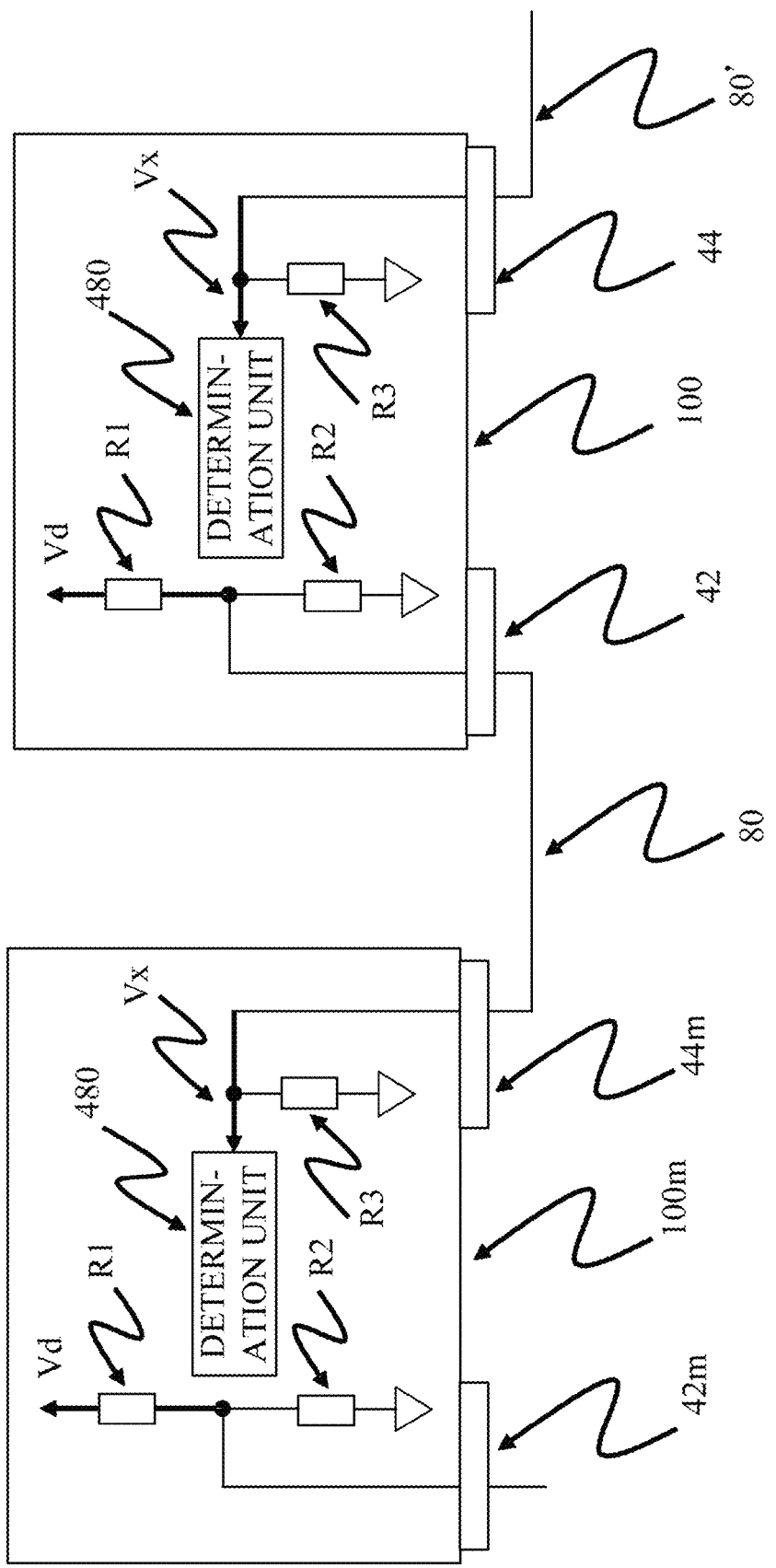
FIG. 25 illustrates a configuration of a misconnection (erroneous connection) determination circuit according to a seventh embodiment of the present invention.

FIG. 25 illustrates a configuration of a misconnection determination circuit included in each of the projector 100m according to a seventh embodiment of the present invention and another projector 100. The misconnection determination circuit includes a voltage setting unit and a determination unit (connection determination unit) 480. In this embodiment, those which perform operations similar to those of the first embodiment will be designated by the same reference numerals as those of the first embodiment, and a description thereof will be omitted.

The projectors 100m and 100 can normally communicate with each other by normally connecting the cable 80 to the connector 44m in the master projector 100m and the connector 42 in the other projector 100. Similarly, when the cable 80' is normally connected to the connector 44 in the projector 100 and the connector 42' in the other projector 100' which is not illustrated in FIG. 25, the projectors 100 and 100' can normally communicate with each other.

The determination unit 480 in each projector determines whether the level of the input voltage value is high (H) or low (L). When the determination unit 480 is TTL (Transistor Transistor Logic) or LVTTL (Low Voltage TTL), it becomes H at about 2.0 V or more as a threshold and becomes L at about 0.8 V or less. In case of CMOS (Complementary Metal Oxide Semiconductor), there are many types, and the logic level differs for each type. For example, it becomes H when the input voltage value is the power supply voltage value times 0.7 or higher, and becomes L when the input voltage value is the power supply voltage times 0.2 or lower. More specifically, when the power supply voltage is 3.3 V, it becomes H at 2.3 V or higher, and becomes L at 0.66 V or lower.

More specifically, the determination unit 480 determines the level of the voltage Vx of the resistor R3 that has been pulled down to GND. The voltage Vx in the master projector 100m is connected to a voltage setting unit in the projector 100 via the cable 80. The voltage setting unit includes a voltage Vd and resistors R1 and R2, and a voltage Vx is generated at a midpoint between the resistors R1 and R2, and the magnitude thereof is determined by the determination unit 480 in the master projector 100m. The determination unit 480 makes an error determination as to whether or not the other projector 100 is connected to the master projector 100m (normal connection or non-correction) based on the result of the voltage Vx magnitude determination.

For example, assume that Vd=3.3 V, R1=10 kΩ, R2=100 kΩ, and R3=100 kΩ. Then, when the other projector 100 is normally connected to the master projector 100m, Vx=2.75 V. For example, when the determination unit 480 is CMOS, it is determined to be H (normal connection). On the other hand, when the other projector 100 is not connected to the master projector 100m, the cable 80 is not connected, Vx becomes 0V, and the determination is L (unconnected).

When the LAN cable is used for the cable 80 and RJ-45 is used for the connectors 44m and 42, the cable 80 may be erroneously connected to the RJ-45 connector of the Ethernet device.

FIG. 26 shows an illustrative pin arrangement of an RJ-45 connector connected to the LAN cable. The connection of the differential pair line for the full-duplex communication, the pair line for the half-duplex communication, and the GND line is the same as that described in FIG. 24 in the sixth embodiment. CN_CHK is input to the fifth pin as the straight-connected pin. CN_CHK is a signal from the voltage setting unit formed by the resistors R1 and R2 in the projector 100 illustrated in FIG. 25, and is supplied to connected to the opposite end of the pull-down end of the resistor R3 in the master projector 100m via the connectors 42 and 44m and the cable 80, and input as the voltage Vx to the determination unit 480.

FIG. 26 illustrates a 100BASE-T signal in addition to the 10BASE/100BASE-TX signal which is the Ethernet signal described in the above embodiment. For example, since 10BASE/100BASE-TX is NC for CN_CHK connected to the fifth pin, it is unconnected. On the other hand, since 1000BASE-T uses all eight communication lines, the differential pair signals of TRD2+ and TRD2− are connected to GND of the fourth pin and CN_CHK of the fifth pin. Therefore, when the cable 80 is misconnected to the Ethernet device, the other projector is unconnected in the case of 10BASE/100BASE-TX, and is connected to the differential pair signal in case of 1000BASE-T. In case of 1000BASE-T, since the pulse transformer is connected to the subsequent stage of the RJ-45 connector, the fourth and fifth pins are short-circuited in terms of DC.

FIG. 27 illustrates the results of the determination (level determination and error determination) by the determination unit 480 when the cable 80 is normally connected, when it is not connected, and when it is misconnected (erroneously wired) to the Ethernet device.

The level determination results for the normal connection and the disconnection are H and L, respectively, as described above, and the error determination results are normal and unconnected, respectively.

If the cable is misconnected to the 10BASE/100BASE-TX device, Vx=0V due to the disconnection. As a result, the level determination result becomes L and the error determination result becomes unconnected.

If the cable 80 is misconnected to the 1000BASE-T device, the fourth and fifth pins of the connector 44m are short-circuited inside the 1000BASE-T device. Therefore, since both ends of the resistor R3 in the preceding stage of the determination unit 480 are connected to GND, Vx=0V, the level determination result is L, and the error determination result is unconnected.

Thus, before the communication of the real-time command or the general command starts in the master projector 100m, the determination unit 480 performs the level determination and the error determination. In case of disconnection, a control that displays a warning representative of the disconnection or misconnection may be made so as to prevent various commands to be communicated. Thereby, the disconnection or the misconnection to another device can be previously detected, and the command communication can be performed only during the normal connection. In case of the misconnection to the Ethernet device, the Ethernet device due to the misconnection can be prevented from being broken by previously detecting the misconnection and stopping the command communication.

The misconnection detection by the determination unit and the voltage setting unit is applicable not only to this embodiment but also to the first to sixth embodiments.

As described above, in this embodiment, the determination unit and the voltage setting unit can determine whether the daisy chain connection is normal or not, and can detect the disconnection or misconnection. This makes it possible to detect the disconnection or the misconnection before the command communication, and in particular to prevent a failure of the misconnected device.

Eighth Embodiment

Figure 28:
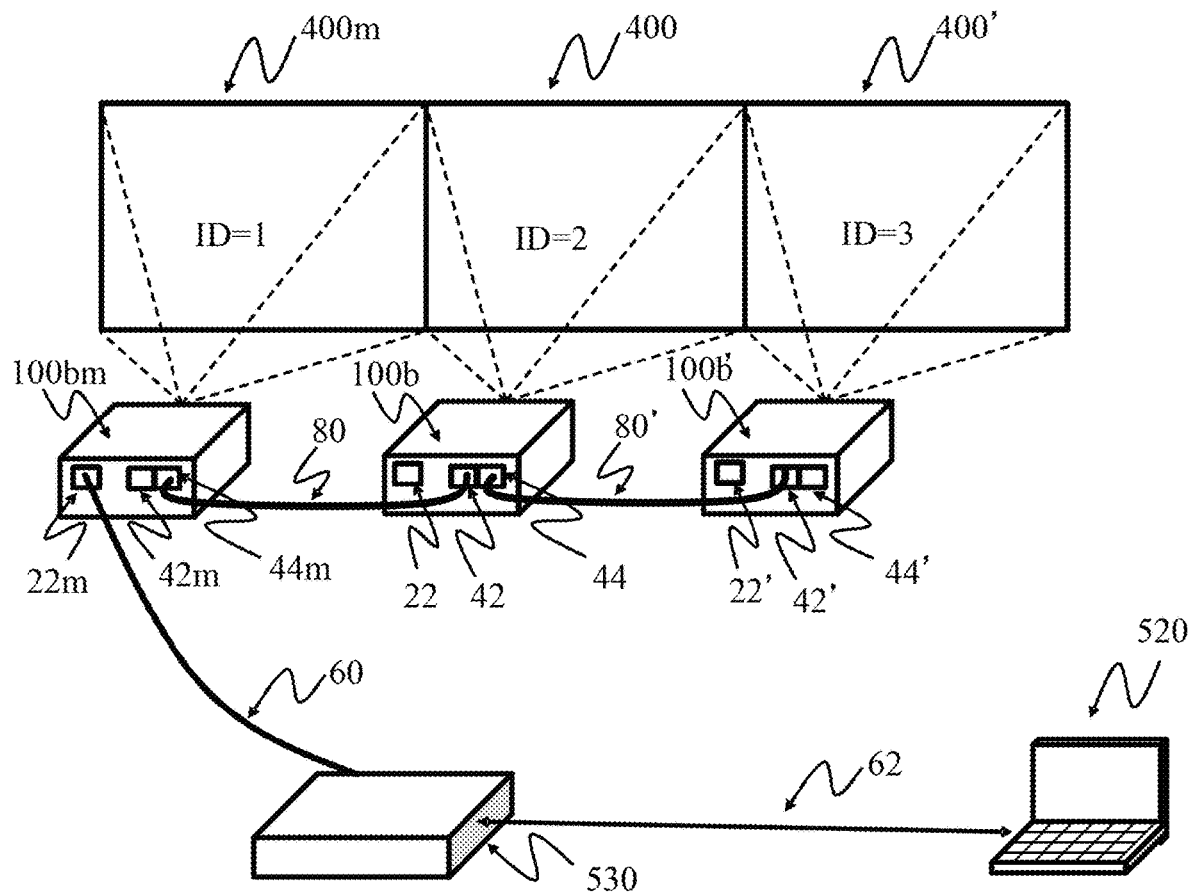
FIG. 28 illustrates a multi-display system according to an eighth embodiment of the present invention.

FIG. 28 illustrates a multi-display system according to an eighth embodiment of the present invention. The multi-display system includes N (three in the figure) image projectors 100bm, 100b, and 100b' serving as a plurality of image projectors. The projector 100bm is a master projector (master device), and corresponds to a first image projection apparatus. The projectors 100b and 100b' correspond to N−1 other image projection apparatuses, and operate in response to a request (instruction) from the master projector 100bm. Projection images 400m, 400, and 400' from the projectors 100bm, 100b, and 100b' are provided with identification information IDs=1, 2, and 3, respectively.

Figure 29:
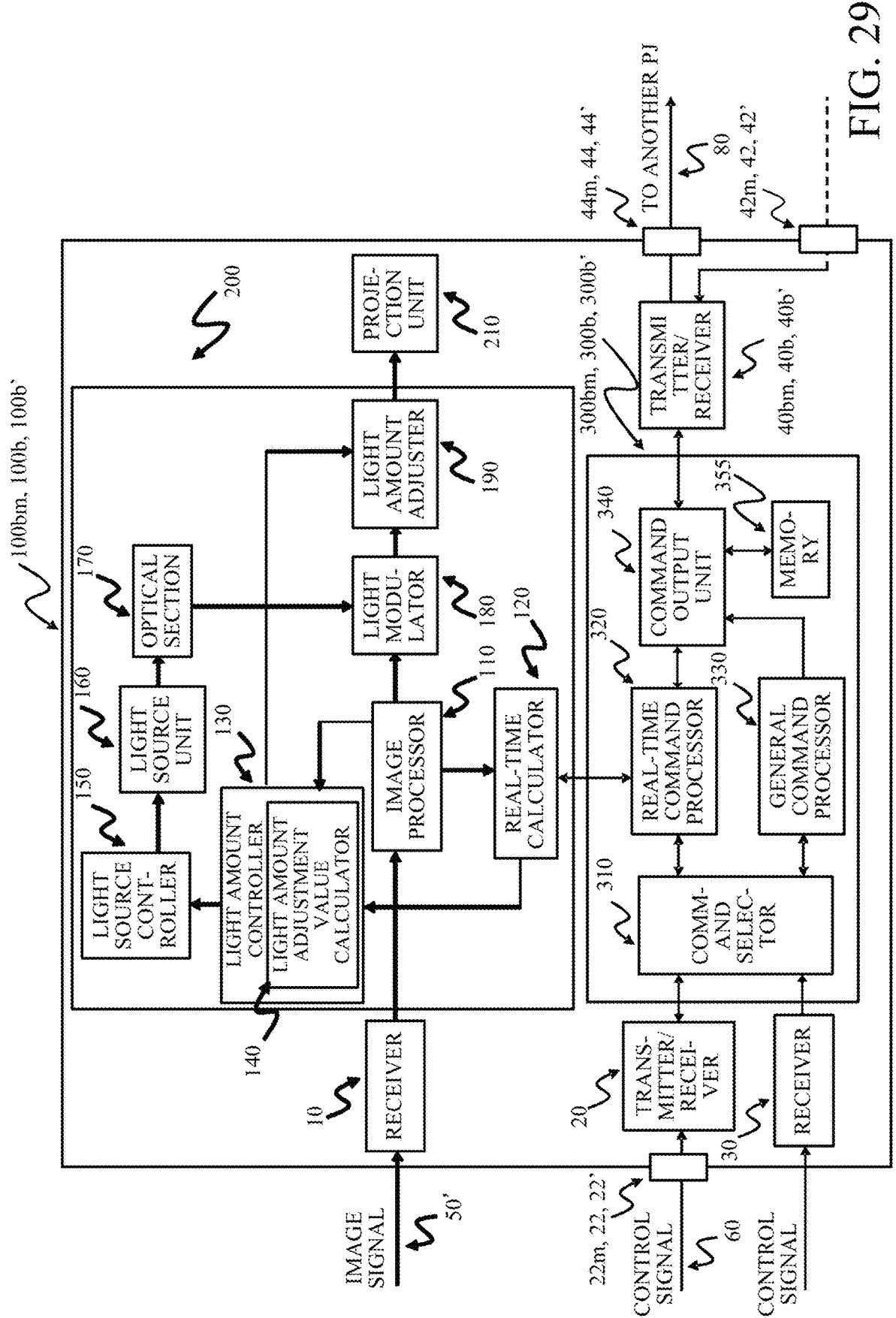
FIG. 29 is a block diagram illustrating details of an internal configuration of each projector according to the eighth embodiment.

The basic configurations and operations of the projectors 100bm, 100b, and 100b' are the same as those of the projectors 100m, 100, and 100' in the first embodiment described with reference to FIGS. 2 and 3. However, as illustrated in FIG. 29, a memory 355 is provided to the command controllers 300bm, 300b, and 300b' in the projectors 100bm, 100b, and 100b' according to this embodiment. The projectors 100bm, 100b, and 100b' according to this embodiment have second command transmitter/receivers 40bm, 40b, and 40b' as communicators.

Figure 30:
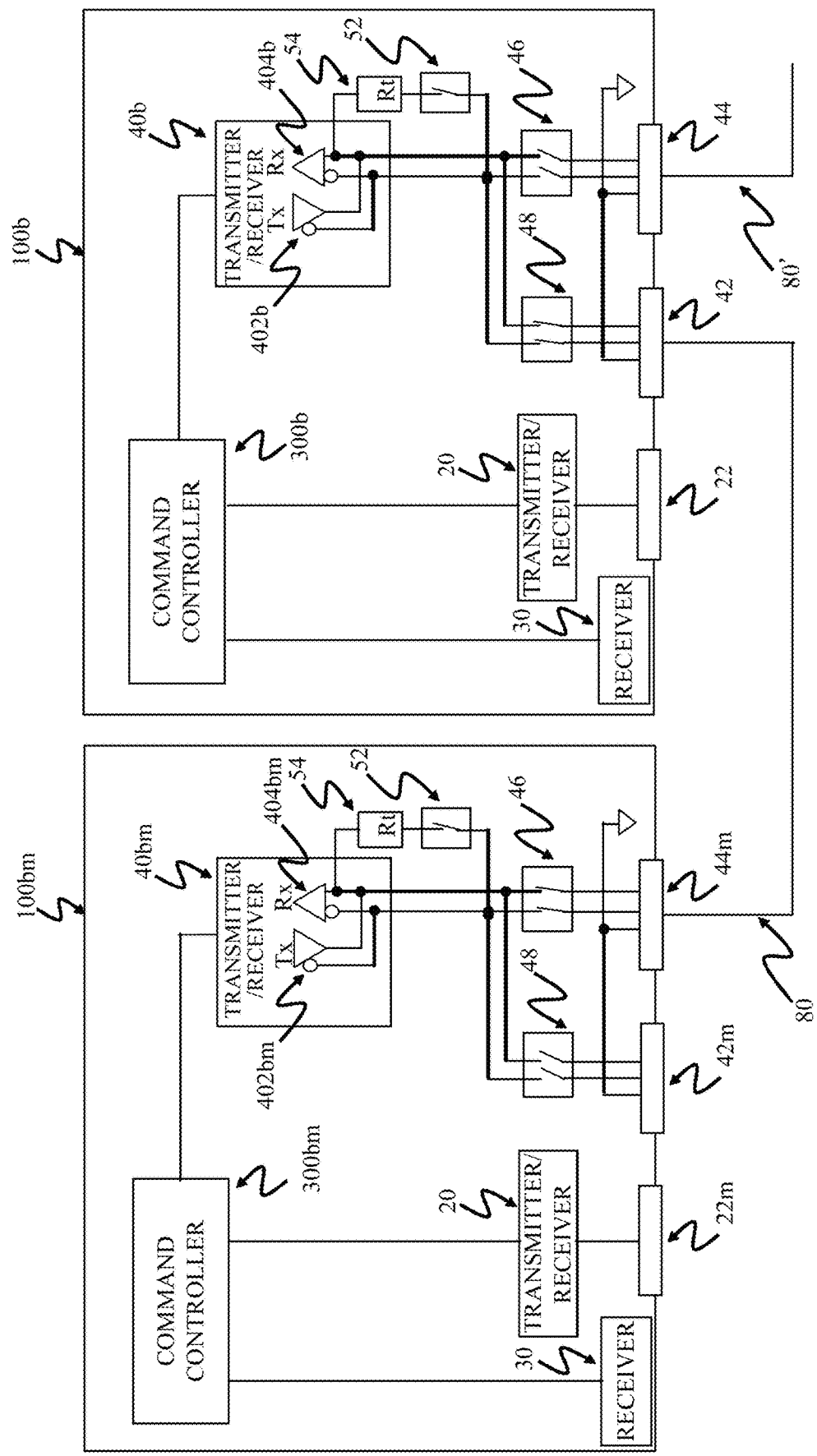
FIG. 30 is a block diagram illustrating configurations of a communicator and a switching unit according to the eighth embodiment.
Figure 31A:
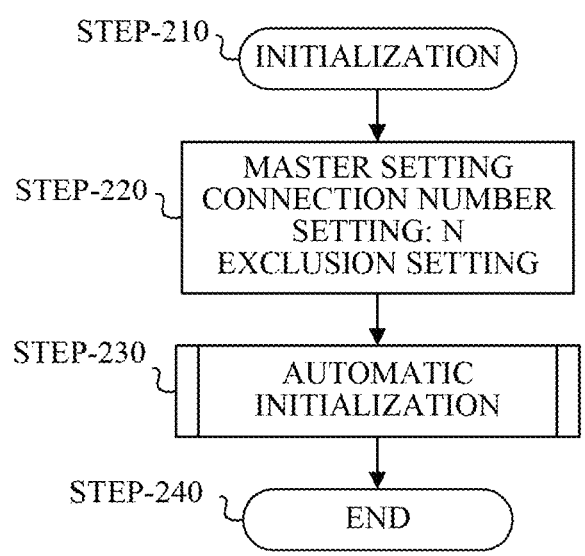
FIG. 31A is a flowchart showing initialization processing according to the eighth embodiment.
Figure 31B:
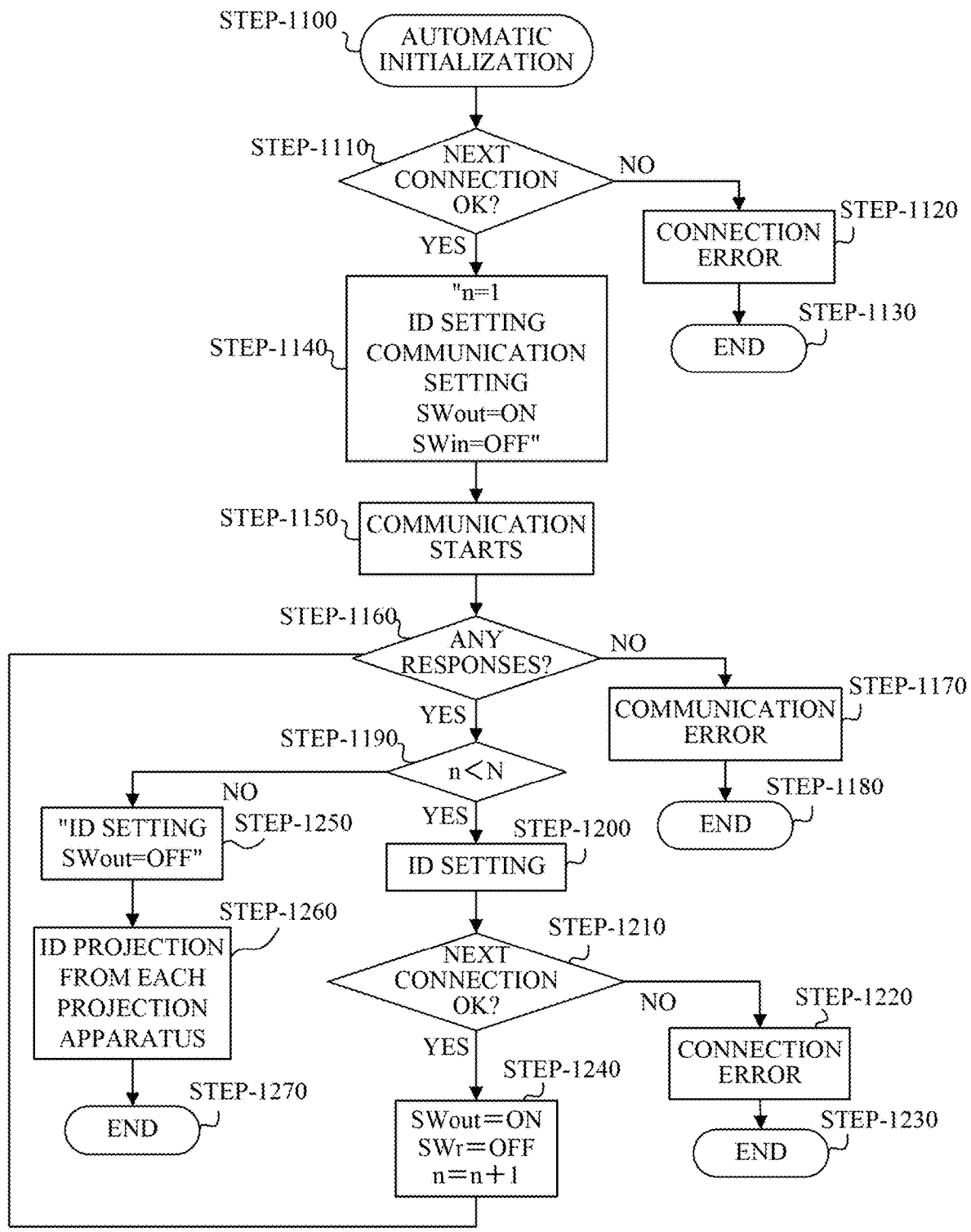
FIG. 31B is a flowchart showing automatic initialization processing according to the eighth embodiment.

Referring now to FIGS. 30, 31A, and 31B, a description will be given of the configurations and initializations of the second command transmitter/receivers 40bm, 40b, and 40b'. FIG. 30 illustrates the second command transmitter/receivers 40bm and 40b in the projectors 100bm and 100b connected by the cable 80. Although not illustrated in FIG. 30, the second command transmitter/receivers 40b and 40b' in the projectors 100b and 100b' are also connected by the cable 80'.

The second command transmitter/receivers 40bm and 40b perform the half-duplex communication (multipoint communication) using RS-422 or RS-485. The second command transmitter/receiver 40bm includes a transmitter (Tx) 402bm and a receiver (Rx) 404bm, and the second command transmitter/receiver 40b includes Tx402b and Rx404b. In each second command transmitter/receiver, the positive output of Tx is connected to the positive input of Rx, and the negative output of Tx is connected to the negative input of Rx. Each second command transmitter/receiver performs the half-duplex communication using a two-wire communication line.

In the projectors 100bm and 100b, the two-wire communication line is connected to the connectors 44m and 42 as the first connectors via the switch 46 as the first switching unit, and is connected to the connector 42m as the second connector via the switch 48 as the second switching unit.

In order to improve the communication signal quality in the high-speed communication, a terminating resistor 54 is provided to the second command transmitter/receivers 40bm and 40b, and a switch 52 is provided as a third switching unit configured to switch the connection (ON) and disconnection (OFF) between the second command transmitter/receivers 40bm and 40b and the terminating resistor 54.

A flowchart in FIG. 31A illustrates the initialization processing of the projectors 100bm, 100b, and 100b'. The command controller 300bm in the master projector 100bm performs initialization processing of the master projector 100bm and the other projectors 100b and 100b' daisy-chained with the master projector 100bm in accordance with an initialization instruction from the PC 520. The command controller 300bm may receive the initialization instruction from an operation panel provided on the remote control device or the master projector 100bm.

The PC 520 that has instructed the initialization in the Step-210 designates the projector 100bm as the master projector in the Step-220, and sets the number (number of connected units) N of the daisy-chained projectors 100bm, 100b, and 100b' to the master projector 100bm. If there is a projector among the N projectors which does not transmit or receive the command, the location of that projector counted from the master projector 100bm is set to the master projector 100bm. The master projector 100bm having these settings performs the automatic initialization processing in the Step-230. This automatic initialization processing will be described later.

A description will now be given of a misconnection detection in the daisy chain connection. In FIG. 30, the connector 22m is an RJ-45 connector when the first command transmitter/receiver 20 performs the LAN communication, and the connector 22*m* is a Dsub connector when it performs the serial communication with RS-232C.

On the other hand, RJ-45 and Dsub connectors are also used for the connectors 42*m* and 44*m* connected to the second command transmitter/receiver 40*m*. In this case, if the cable 80 for the daisy chain connection is erroneously connected to the connector 22*m* or another device (such as the PC 520 or the HUB 530) unrelated to the daisy chain connection, the initialization processing does not properly work. At this time, it is necessary to investigate the misconnection and another cause and to devise a countermove. However, when there are many daisy-chained projectors, when the projectors are distant from each other, or when it is difficult to access the projector, a long time and great effort are necessary to clear up the cause and devise a countermove.

Figure 32:
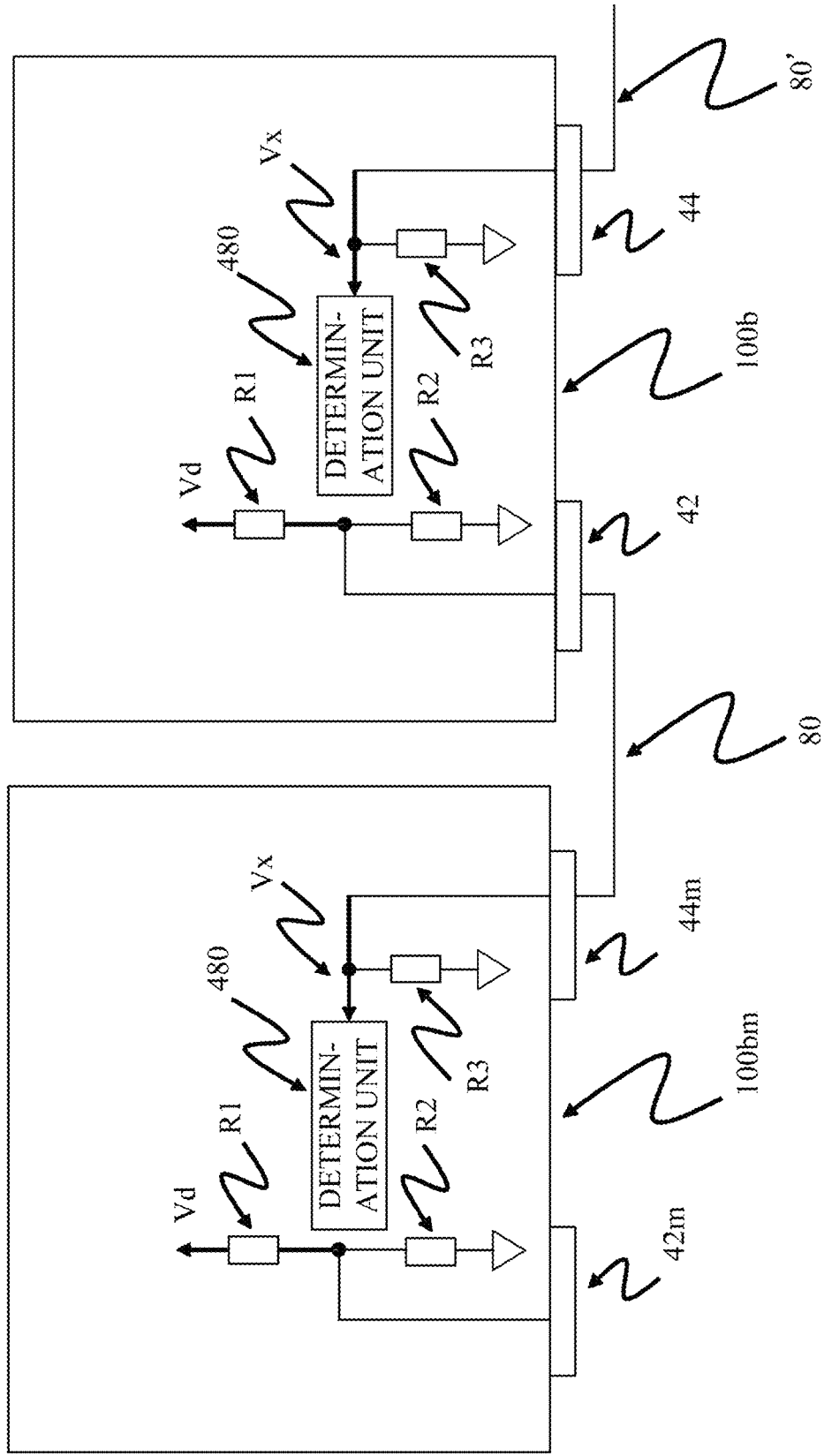
FIG. 32 illustrates a configuration of a misconnection detection circuit according to an eighth embodiment.

Each projector has a misconnection determination circuit illustrated in FIG. 32 so as to determine whether the daisy chain connection is normal. The configuration of the misconnection determination circuit is the same as that of the misconnection determination circuit in FIG. 25 described in the seventh embodiment. The determination unit (connection determination unit) 480 and the resistor R3 are connected to each of the connectors (first connectors) 44*m* and 44 in the projectors 100*bm* and 100*b*, respectively, and Vd as the voltage source and the resistors R1 and R2 are connected to the connectors (second connectors) 42*m* and 42. Although not shown, the same applies to the projector 100*b'*.

As described in the seventh embodiment, only if the cable 80 is correctly connected to the connector 44*m* in the master projector 100*bm* and the connector 42 in the projector 100*b*, the determination unit 480 in the master projector 100*bm* determines the normal connection when the voltage Vx of the input line to the determination unit 480 becomes a predetermined value. On the other hand, when the cable 80 is not connected or is erroneously connected to another device, the determination unit 480 in the master projector 100*bm* determines the disconnection or misconnection since the input line voltage Vx does not have the predetermined value.

Similarly, the determination unit 480 in the projector 100*b* determines that the connection is normal if the cable 80' is correctly connected to the connector 44 in the projector 100*b* and the connector 42*b'* in the projector 100*b'*, and determines the disconnection or misconnection when the cable 80' is unconnected or incorrectly connected to another device.

Although the misconnection determination circuit according to this embodiment uses the three resistors R1, R2 and R3, another circuit may be used as long as a predetermined voltage or current source is connected to the connectors 42*m* and 42. When the input line to the determination unit 480 is opened or short-circuited due to the supposed misconnection, the voltage Vx becomes 0V. Then, the predetermined value for the voltage Vx in this case needs a sufficient margin to noises, such as about 1V to several volts. The determination unit 480 may determine the magnitude of the voltage Vx relative to the threshold, and include an analog comparator or a digital input port.

A flowchart in FIG. 31B shows details of the automatic initialization processing executed by the command controller 300*bm* in the Step-230 illustrated in FIG. 31A. In the Step-1110, the command controller 300*bm* checks through the misconnection determination circuit whether the subsequent projector 100*b* is normally connected or daisy chained. The command controller 300*bm* that has determined that the projector 100*b* is unconnected or misconnected to another device performs connection error processing in the Step-1120, and ends (stops) the automatic initialization processing in the Step-1130. In the connection error processing, the command controller 300*bm* stores, for example, information on the disconnection or misconnection in the memory 355, and transmits the information to the PC 520 via the first command transmitter/receiver 20. Thereby, which cable caused the misconnection can be confirmed, and the state can quickly be returned to the normal connection.

If the projector 100*b* is normally connected, the command controller 300*bm* proceeds to the Step-1140, and performs communication related initialization in the master projector 100*bm*. More specifically, the command controller 300*bm* sets n to 1, where n is the number of initialized projectors out of the number of connected units N set in the Step-220 in FIG. 31A. The command controller 300*bm* also sets identification information (ID)=1 to the master projector 100*bm* for the initialization. ID is information unique to each projector, and may be a number or a symbol. The command controller 300*bm* performs communication settings necessary for the second command transmitter/receiver 40*bm* to perform the communication for the initialization. The communication setting is, for example, an initial setting, such as setting a communication rate and turning on a communication enable signal (a signal indicating a communication enabled state).

The command controller 300*bm* turns on SWout of the master projector 100*bm* and turns off SWin for the initialization. SWout indicates a switch (first switching unit) 46, and SWin indicates a switch (second switching unit) 48. In the initialization of the master projector 100*bm*, the switches 46 and 48 need to be set to states opposite to each other among the connection (ON) and the disconnection (OFF) as illustrated in FIG. 30. On the other hand, the switches 46 and 48 of the projector 100*b* are turned off and on, respectively, in the initial settings. In this case, the switch 48 connected to the connector (second connector) 42*m* in the master projector 100*bm* is turned off. Hence, even when the cable 80 is connected to the connector 42*m*, the communication between the master projector 100*bm* and the projector 100*b* via the cable 80 is not performed by the switch 48 that is turned off.

The switch 46 connected to the connector (first connector) 44*m* is turned on. Therefore, when the cable 80 is connected to the connector 44*m* and the connector (second connector) 42 in the projector 100*b*, and when the switch 48 connected to the connector 42 is turned on, the master projector 100*bm* and the projector 100*b* can communicate with each other.

On the other hand, in the projector 100*b*, the switch 46 connected to the connector (first connector) 44 is turned off. Therefore, even when the cable 80' is connected to the connector 44 and the cable 80' is connected to the subsequent projector 100*b'*, the communication with the projector 100*b'* is not performed by the switch 46 that is turned off.

In the initialization in the multipoint communication, it is necessary for the master projector 100*bm* and the other projectors 100*b* and 100*b'* to perform the one-to-one communication to set the ID. For example, when the switch 46 of the projector 100*b* is turned on, the communication with the projector 100*b'* connected at the subsequent stage is also performed to provide the one-to-many communication, and thus the ID cannot be set to each of the projectors 100*b* and 100*b'*.

Since turning on and off each switch cannot be changed before the initialization, the switch 46 in the projectors 100*b* and 100*b'* must be turned off. By turning on only the switch 46 in the master projector 100*bm* in the Step-1140, the one-to-one communication with the subsequent projector 100*b* is available. This makes it possible to initialize the first (next) projector 100*b* in the N−1 daisy-chained projectors.

In the Step-1150, the command controller 300*bm* performs the communication from the second command transmitter/receiver 40*bm* to the command controller 300*b* of the next projector 100*b*. This communication includes an initialization command for causing the projector 100*b* to perform the initialization.

As described even in the seventh embodiment, for the high-speed communication, the termination resistor 54 and the switch 52 as the third switching unit for turning on and off the connection of the termination resistor 54 may be provided as illustrated in FIG. 30. The switch 52 is turned on in the initial setting. Since the switch 52 in the projector 100*b* is also turned on in the initial setting, the connection of the terminating resistor 54 is turned on. Thus, in the Step-1150, when the command controller 300*bm* turns on only the switch 46 in the master projector 100*bm* to perform the one-to-one communication between the master projector 100*bm* and the projector 100*b*, the accurate communication and initialization can be provided by improving the communication signal quality.

In the Step-160, if there is no response from the projector 100*b* with which communication has been made, the command controller 300*bm* proceeds to the Step-1170 to perform the communication error processing and ends (aborts) the automatic initialization processing in the Step-1180. On the other hand, if there is a response from projector 100*b*, the command controller 300*bm* proceeds to the Step-1190.

In the Step-1190, the command controller 300*bm* checks the number n of the initialized projectors. If n is smaller than N, it sets the ID to the (n+1)-th projector in the Step-1200.

If there is a projector in the daisy-chained projectors which is set not to transmit or receive the command, the invalid command transmission and reception can be set to that projector in setting the ID. In this case, the acceptability of the transmission and reception of the initialization command or the reset command can cancel the set invalid command transmission and reception depending on the situation. Thereby, the command can be transmitted and received by the daisy chain connection, and settings can be easily adjusted.

Next, in the Step-1210, the command controller 300*bm* confirms whether or not the subsequent projector 100*b*' is normally connected. If the misconnection is determined, the command controller 300*bm* proceeds to the Step-1220, performs the connection error processing, and ends (stops) the automatic initialization processing in the Step-1230. In the connection error processing, as described above, when the information on the disconnection or the misconnection is stored in the memory 355 and sent to the PC 520 via the first command transmitter/receiver 20, which cable caused the misconnection can be confirmed, and the flow can quickly return to the normal connection.

When the projector 100*b*' is normally connected, the command controller 300*bm* turns on the switch 46 as SWout of the projector 100*b*' and turns off the switch 52 as SWr in the Step-1240. By inverting the states of these switches 46 and 48, the daisy-chained projector 100*b* (second command transmitter/receiver 40*b*) or the projector 100*b*' (second command transmitter/receiver 40*b*') can communicate with the master projector 100*bm* (second command transmitter/receiver 40*bm*). Thus, the projectors 100*b* and 100*b*' can be initialized. In the Step-1240, 1 is added to n, and the flow returns to the Step-150 to initialize the next projector.

When n reaches N in the Step-1190, the command controller 300*bm* proceeds to the Step-1250, sets the ID to the N-th projector, and turns off the switch 46 as SWout for the N-th projector. The N-th projector is the last projector among the daisy-chained projectors. By turning off SWout (switch 46), the signal from the master projector 100*mb* (second command transmitter/receiver 40*bm*) is cut off even if a new projector is connected to that last projector, and thus the communication with the master projector 100*mb* is not performed.

On the other hand, the terminal resistor 54 is connected while the SWr (switch 52) of the N-th projector remains turned on. Thereby, the termination resistor 54 in the master projector 100*bm* and the termination resistor 54 in the N-th projector, which are both ends of the daisy chain connection, are connected to each other, and the communication signal quality between them is improved, and the accurate communication can be performed.

When the initializations for all the projectors normally end in this way, the command controller 300*bm* makes each projector in the Step-1260 project the information (on the initialization) including the ID set in the initialization and the state of the projector (device state). When a plurality of projectors are daisy-chained, it is necessary to check whether or not the connection state, the order of connection, the installation position, and the like are correct. For example, FIG. 28 shows ID=1, 2, and 3 set in the initialization as the projection images 400*m*, 400, and 400' from the projectors 100*bm*, 100*b*, and 100*b*'. In this way, by making each projector display the initialization information, it is possible to efficiently check the connection state of the daisy chain connection, the order of the connected projectors, the installation position of each projectors, and the like.

Thereafter, the command controller 300*bm* proceeds to the Step-1270 and ends the automatic initialization processing.

The initialization setting of each projector is stored in the memory 355 of each projector. When the projector is restarted after the power is turned off, the initialization setting is reflected from the memory 355. Thereby, the command can be transmitted and received among a plurality of daisy-chained projectors according to the initialization settings.

In the restart, the master projector 100*bm* may confirm the current daisy chain connection state and the initialization setting of each projector relative to the last initialization condition, and if there is a difference, display a warning and to enable the user to check whether to change the initialization setting.

This embodiment can easily, reliably, and collectively initialize the communication for the plurality of projectors, saving labor of separately initializing each projector.

Ninth Embodiment

Figure 33:
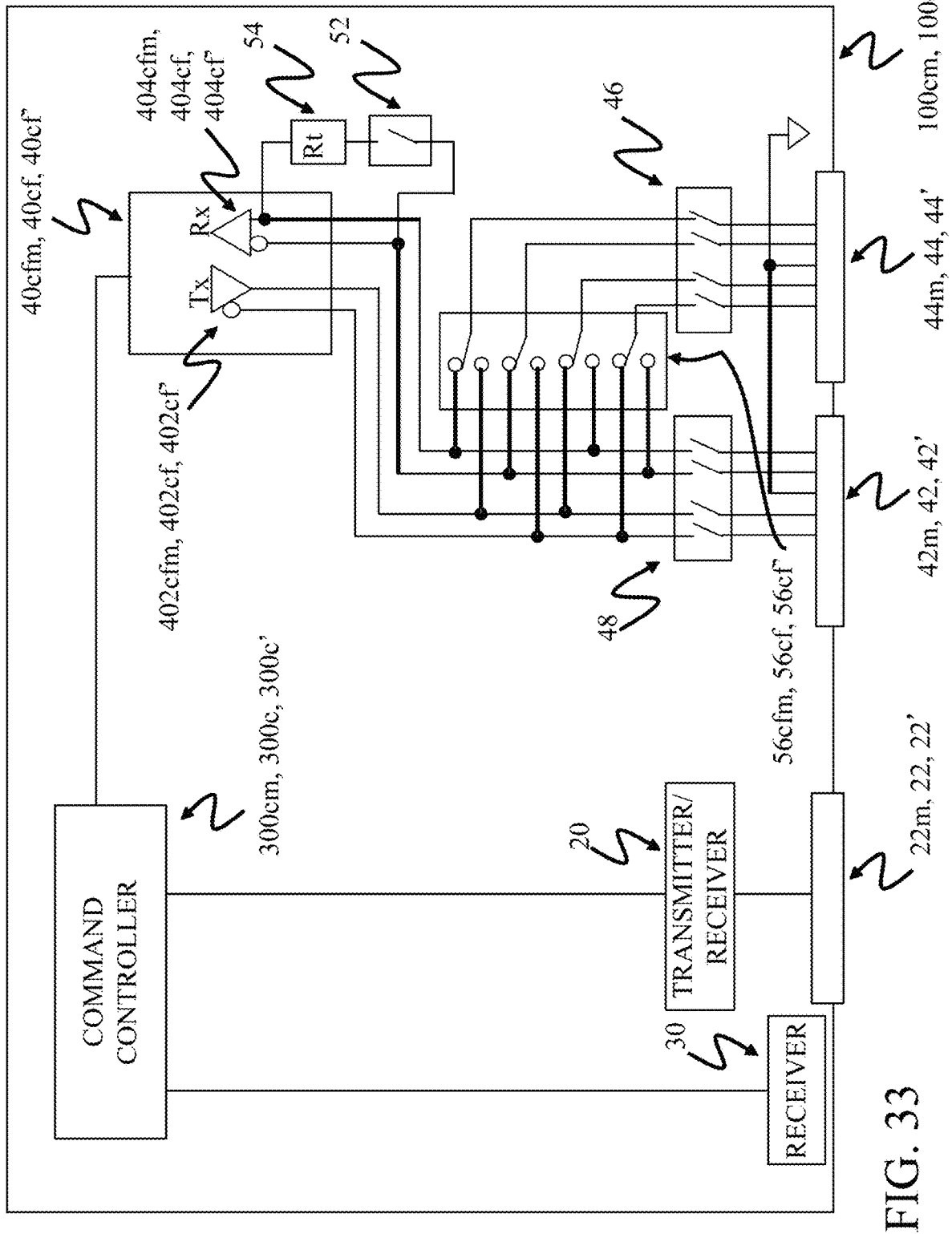
FIG. 33 is a block diagram illustrating a configuration of a communicator and a switching unit according to a ninth embodiment of the present invention.

FIG. 33 illustrates the configuration of each of projectors 100*cm*, 100*c*, and 100*c*' according to a ninth embodiment of the present invention. Those elements in this embodiment, which perform operations similar to those in the eighth embodiment (FIG. 30) will be designated by the same reference numerals, and a description thereof will be omitted. The projectors 100*cm*, 100*c*, and 100*c*' according to this embodiment are different from those of the eighth embodiment in that second command transmitter/receivers 40*cfm*, 40*cf*, and 40*cf*' and switching units 56*cfm*, 56*cf*, and 56*cf* as a fourth switching unit for switching the transmission and reception directions.

The second command transmitter/receivers 40cfm, 40cf, and 40cf' perform the four-wire full-duplex communication, and include transmitters Tx (402cfm, 402cf, and 402cf') and receivers Rx (404cfm, 404cf, and 404cf'). The switching units (56cfm, 56cf, and 56cf') select one of Tx (402cfm, 402cf, and 402cf') and Rx (404cfm, 404cf, and 404cf') in response to the signal from the second command transmitter/receiver (40cfm, 40cf, and 40cf), and connect it to the switch 46 and connectors (44m, 44, and 44').

Figure 34:
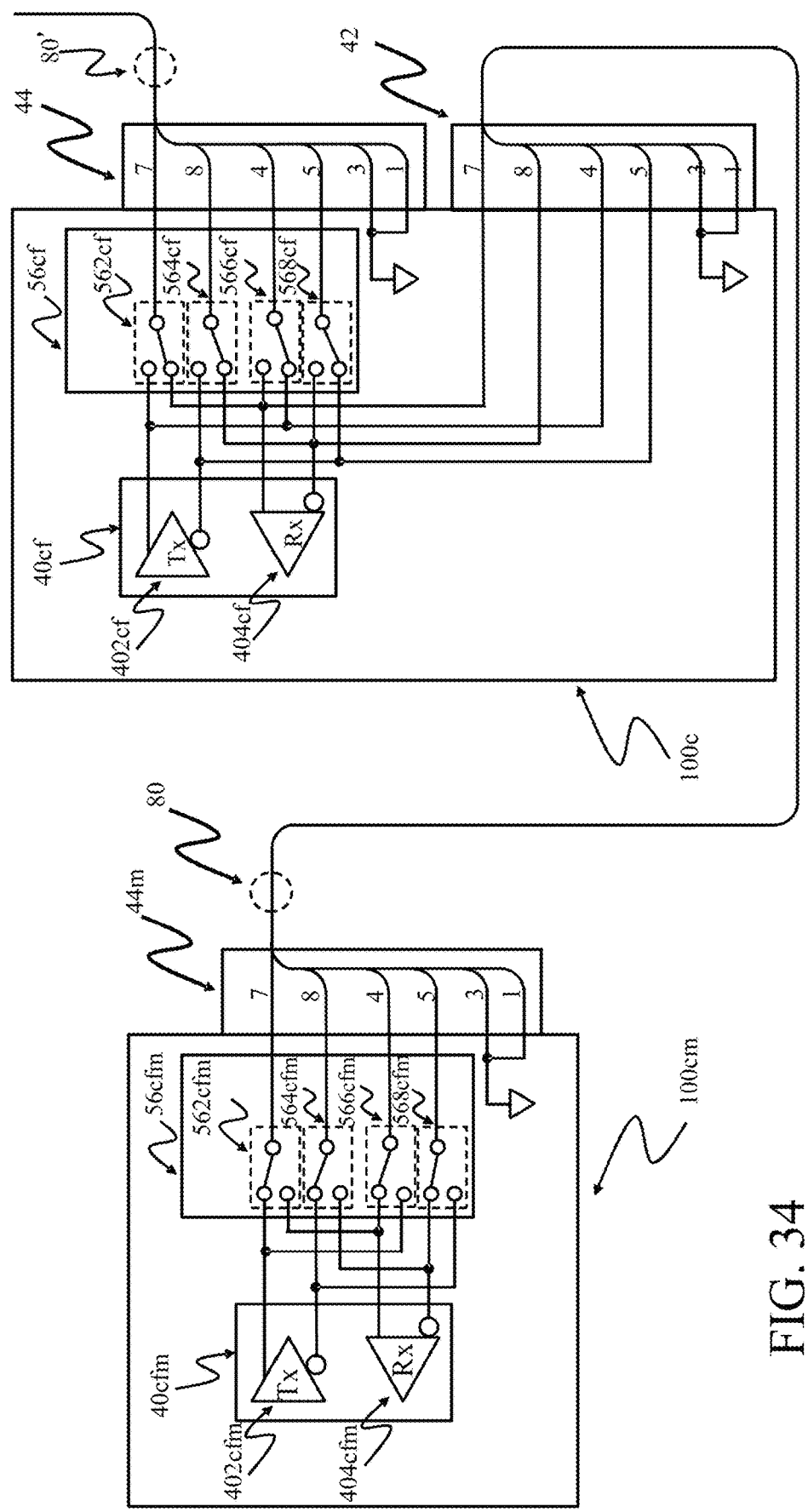
FIG. 34 illustrates connections of the switching unit for the full-duplex communication according to the ninth embodiment.

FIG. 34 illustrates a connection example of the master projector 100cm, the second command transmitter/receivers 40cfm and 40cf and the switching units 56cfm and 56cf in the projector 100c in the full-duplex communication. The connection between the second command transmitter/receiver 40cf and the switching unit 56cf in the projector 100c' is the same as the connection between the second command transmitter/receiver 40cf and the switching unit 56cf in the projector 100c. FIG. 34 omits the switches 46, 48, and 52, the connector 42m, and the terminating resistor 54.

The switching unit 56cfm in the master projector 100cm includes a switch 562cfm for selecting one of a positive output of Tx402cfm and a positive input of Rx404cfm, and a switch 564cfm for selecting one of a negative output of Tx402cfm and a negative input of Rx404cfm. The switching unit 56cfm further includes a switch 566cfm for selecting one of a positive output of Tx402cfm and a positive input of Rx404cfm, and a switch 568cfm for selecting one of a negative output of Tx402cfm and a negative input of Rx404cfm. The switching unit 56cfm connects the selected signal to the connector 44m.

In FIG. 34, in the connector 44m, a positive signal of Tx402cfm is connected to the seventh pin, a negative signal of Tx402cfm is connected to the eighth pin, a positive signal of Rx404cfm is connected to the fourth pin, and a negative signal of Rx404cfm is connected to the fifth pin. These signals are connected via the cable 80 to the connector 42 in the daisy-chained projector 100c.

Herein, in the full-duplex multipoint communication, Rx404cf in the other projector 100c needs to receive a signal from Tx402cfm in the master projector 100cm. Similarly, Rx404cfm in the master projector 100cm needs to receive the signal transmitted from Tx402cf in the other projector 100c. Therefore, the connection destinations of the switching units 56cfm and 56cf are different between master projector 100cm and other projectors 100c. More specifically, the switching unit 56cfm in the master projector 100cm connects the positive signal of Tx402cfm to the seventh pin of the connector 42m, the negative signal of Tx402cfm to the eighth pin, the positive signal of Rx404cfm to the fourth pin, and the negative signal of Rx404cfm to the fifth pin.

If the cable 80 is the straight cable, the signal transmitted from Tx402cfm in the master projector 100cm is received by Rx404cf in the other projector 100c. Rx404cfm in the master projector 100cm is connected to receive a signal transmitted from Tx402cf in the other projector 100c. Thereby, the full-duplex communication can be normally performed between master projectors 100cm and 100c.

When the projector 100c' is daisy-chained by the cable 80' at the subsequent stage of projector 100c, the second command transmitter/receiver 40cf in the projector 100c' needs the same signal connection as that of the second command transmitter/receiver 40cf in the projector 100c. In this case, the switching unit 56cf in the projector 100c' illustrated in FIG. 33 connects the positive signal of Rx404cf to the seventh pin in the connector 44 and the negative signal of Rx404cf to the eighth pin. In addition, it is set so that it connects the positive signal of Tx402cf to the fourth pin, and the negative signal of Tx402cf to the fifth pin. Thereby, a signal connection similar to that of the second command transmitter/receiver 40cf in the projector 100c is obtained in the second command transmitter/receiver 40cf in the subsequent projector 100c', and the full-duplex communication can be normally performed between the projectors 100c and 100c'.

Thus, the master projector 100cm switches the transmission and reception directions only by the switching unit 56cfm, and thus can correctly connect the second command transmitter/receivers 40cfm, 40cf, and 40cf' to the projectors 100c and 100c'. Thereby, the full-duplex communication can be normally performed among a plurality of daisy-chained projectors.

The switching unit 56cfm of the master projector 100cm switches the transmission and reception directions in the Step-1140 in the automatic initialization processing illustrated in FIG. 31B according to the eighth embodiment.

As described above, when a plurality of daisy-chained projectors perform the four-wire full-duplex communication, this embodiment switches the signal transmission and reception directions in the second command transmitter/receiver in each projector and thereby normally performs the full-duplex communication among the plurality of projectors. This configuration can easily and reliably initialize the communication in the plurality of projectors.

Each of the above embodiments has described the projector that projects and displays an image onto the projection surface, but the display apparatus according to the present invention includes not only the projector but also other display apparatuses such as a so-called direct-view display.

The first to seventh embodiments can normally transmit and receive the first and second commands while reducing the number of cables connecting a plurality of display apparatuses.

The eighth embodiment can easily perform the communication related initialization for a plurality of display apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), micro processor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-030190, filed on Feb. 22, 2019, which is hereby incorporated by reference herein in its <or their, if more than one> entirety.

What is claimed is:

1. A display apparatus configured to display an image corresponding to an image signal, the display apparatus comprising:
a receiver configured to receive a first command irregularly transmitted from outside;
a transmitter configured to perform a full-duplex or half-duplex communication with another display apparatus connected to the display apparatus via a cable and transmit the first command to the other display apparatus and a second command for instructing an operation of the other display apparatus for each frame of the image signal to the other display apparatus; and
a controller configured to cause the transmitter to transmit the first command to the other display apparatus and to cause the transmitter to transmit the second command to the other display apparatus for each frame of the image signal.

2. The display apparatus according to claim 1, wherein the controller causes the transmitter to transmit the second command to the other display apparatus and then the transmitter to transmit the first command to the other display apparatus.

3. The display apparatus according to claim 1, wherein the controller causes the transmitter to transmit a command that includes both the first command and the second command, to the other display apparatus.

4. The display apparatus according to claim 1, wherein if the first command cannot be transmitted to the other display apparatus in one frame, the controller causes part of the first command to be transmitted to the other display apparatus in a next frame.

5. The display apparatus according to claim 1, wherein the cable is an eight-wire or nine-wire cable.

6. The display apparatus according to claim 1, wherein the transmitter performs a multipoint communication with the other display apparatus.

7. The display apparatus according to claim 1, wherein the transmitter performs the half-duplex communication with the other display apparatus, the cable is a cross cable, and the transmitter includes a pin connected to a straight connection in the cross cable.

8. The display apparatus according to claim 1, wherein the transmitter performs the full-duplex communication with the other display apparatus, the cable is a cross cable, and the transmitter has a pin connected to a cross connection in the cross cable.

9. The display apparatus according to claim 1, wherein the transmitter performs the full-duplex communication with the other display apparatus, the cable is a straight or cross cable, and the transmitter includes a switching unit configured to switch transmission and reception directions according to whether the cable is the straight cable or the cross cable.

10. The display apparatus according to claim 1, wherein each of the display apparatus and the other display apparatus includes a light amount adjuster configured to adjust a light amount for forming the image, and an image processor configured to acquire a feature amount of the image, and
wherein the display apparatus:
acquires the feature amount from the other display apparatus by transmitting the second command from the transmitter to the other display apparatus,
calculates a light amount adjustment value for each display apparatus using the feature amount acquired in the display apparatus and the feature amount acquired from the other display apparatus, and
controls the light amount adjuster of the display apparatus in accordance with the light amount adjustment value, transmits the light amount adjustment value from the transmitter to the other display apparatus, and makes the other display apparatus control the light amount adjustment value.

11. A display apparatus configured to display an image corresponding to an image signal, the display apparatus comprising:
a receiver configured to receive a first command irregularly transmitted from outside;
a first transmitter configured to transmit the first command to another display apparatus;
a second transmitter configured to transmit a second command for requesting an operation for each frame of the image signal to the other display apparatus; and
a controller configured to cause the first transmitter and the second transmitter to transmit the first command and the second command independently of each other to the other display apparatus,
wherein the first and second transmitters perform a full-duplex or half-duplex communication with the other display apparatus connected to the display apparatus via a cable.

12. The display apparatus according to claim 11, wherein the cable is an eight-wire or nine-wire cable.

13. The display apparatus according to claim 11, wherein the first and second transmitters perform a multipoint communication with the other display apparatus.

14. The display apparatus according to claim 11, wherein the first and second transmitter perform the half-duplex communication with the other display apparatus, the cable is a cross cable, and each of the first transmitter and the second transmitter includes a pin connected to a straight connection in the cross cable.

15. The display apparatus according to claim 11, wherein one of the first and second transmitters performs the full-duplex communication with the other display apparatus, the other performs the half-duplex communication, and the cable is the eight-wire cable.

16. The display apparatus according to claim 11, wherein the first transmitter performs the full-duplex communication with the other display apparatus, the second transmitter performs the half-duplex communication, the cable is the cross cable, and the first transmitter includes a pin connected to a cross connection in the cross cable.

17. The display apparatus according to claim 11, wherein the cable is a straight cable or cross cable, one of the first and second transmitters which performs the full-duplex communication with the other display apparatus including a switching unit for switching transmission and reception directions according to whether the cable is the straight cable or the cross cable.

18. The display apparatus according to claim 11, wherein each of the display apparatus and the other display apparatus includes a light amount adjuster configured to adjust a light amount for forming the image, and an image processor configured to acquires a feature amount of the image, and wherein the display apparatus:
   acquires the feature amount from the other display apparatus by transmitting the second command from the second transmitter to the other display apparatus,
   calculates a light amount adjustment value for each display apparatus using the feature amount acquired in the display apparatus and the feature amount acquired from the other display apparatus,
   controls the light amount adjuster of the display apparatus in accordance with the light amount adjustment value, transmits the light amount adjustment value from the second transmitter to the other display apparatus, and makes the other display apparatus control the light amount adjuster.

19. The display apparatus according to claim 1, wherein each of the display apparatus and the other display apparatus includes a determination unit and a voltage setting unit, wherein the determination unit in the display apparatus determines whether or not the other display apparatus is connected by detecting a voltage set by the voltage setting unit of the other display apparatus.

20. A control method of a display apparatus configured to display an image corresponding to the input image signal, the control method comprising the steps of:
   receiving a first command irregularly transmitted from outside;
   performing a full-duplex or half-duplex communication with another display apparatus connected to the display apparatus via a cable and transmitting the first command to the other display apparatus and a second command for instructing an operation of the other display apparatus for each frame of the image signal to the other display apparatus; and
   transmitting the first command to the other display apparatus and transmitting the second command to the other display apparatus for each frame of the image signal.

* * * * *